(12) United States Patent
Yamada et al.

(10) Patent No.: US 7,403,464 B2
(45) Date of Patent: Jul. 22, 2008

(54) LENS AND COMBINATION LENS

(75) Inventors: Masahiro Yamada, Kanagawa (JP); Tetsu Watanabe, Tokyo (JP)

(73) Assignee: Sony Corporation (JP)

( * ) Notice: Subject to any disclaimer, the term of this patent is extended or adjusted under 35 U.S.C. 154(b) by 439 days.

(21) Appl. No.: 10/257,055

(22) PCT Filed: Feb. 13, 2002

(86) PCT No.: PCT/JP02/01176

§ 371 (c)(1), (2), (4) Date: Oct. 8, 2002

(87) PCT Pub. No.: WO02/065164

PCT Pub. Date: Aug. 22, 2002

(65) Prior Publication Data

US 2003/0048739 A1    Mar. 13, 2003

(30) Foreign Application Priority Data

Feb. 14, 2001    (JP) ............................... 2001-37366

(51) Int. Cl.
   *G11B 7/135* (2006.01)
(52) U.S. Cl. ................................. 369/112.24
(58) Field of Classification Search ............ 369/112.26, 369/112.08, 112.13, 112.2, 112.23, 112.24; 359/719
   See application file for complete search history.

(56) References Cited

U.S. PATENT DOCUMENTS 2,043,916 A  *  6/1936  Altman .................. 369/112.26
2,450,965 A  *  10/1948 Jeffree ..................... 356/124
4,592,624 A  *  6/1986  Ushida et al. ............ 359/661

(Continued)

FOREIGN PATENT DOCUMENTS

EP    1 070 972 A2    1/2001

(Continued)

OTHER PUBLICATIONS

International Search Report.

(Continued)

*Primary Examiner*—Joseph Feild
*Assistant Examiner*—Peter Vincent Agustin
(74) *Attorney, Agent, or Firm*—Rader Fishman & Grauer PLLC; Ronald P. Kananen

(57) ABSTRACT

A lens and combination lens able to suppress deviation of an optical axis of a lens occurring at the time of combination and able to be adjusted at a high precision, a method of producing the combination lens, and an optical pickup device and an optical disk drive mounting the combination lens thereon are provided. A first lens L1 comprising a lens body 1 where one surface on an incident side or an emitting side of light is a flat surface and the other surface parallel to the surface formed as the flat surface is a structural element and a second lens L2 comprising a lens body 2 where one surface on an incident side or an emitting side of light is a flat surface and the other surface parallel to the surface formed as the flat surface is a structural element are adhered together. The combination lens is used as the object lens for an optical pickup device and an optical disk drive.

2 Claims, 21 Drawing Sheets

U.S. PATENT DOCUMENTS

| | | | |
|---|---|---|---|
| 4,610,515 A * | 9/1986 | Tanaka | 369/112.26 |
| 5,114,513 A * | 5/1992 | Hosokawa et al. | 156/150 |
| 6,005,834 A | 12/1999 | Maeda et al. | |
| 6,324,149 B1 * | 11/2001 | Mifune et al. | 369/112.01 |

FOREIGN PATENT DOCUMENTS

| | | |
|---|---|---|
| JP | 61-13818 | 1/1986 |
| JP | 61-99115 | 6/1986 |
| JP | 63-149602 | 6/1988 |
| JP | 1-141827 | 6/1989 |
| JP | 7-181303 | 7/1995 |
| JP | 2000-90469 | 3/2000 |
| JP | 2000-149306 | 5/2000 |
| JP | 2000-221305 | 8/2000 |
| WO | WO-00/67252 | 11/2000 |

OTHER PUBLICATIONS

Supplementary European Search Report, Feb. 8, 2007.

* cited by examiner

FIG. 3A
RELATED ART
FIG. 3B
RELATED ART
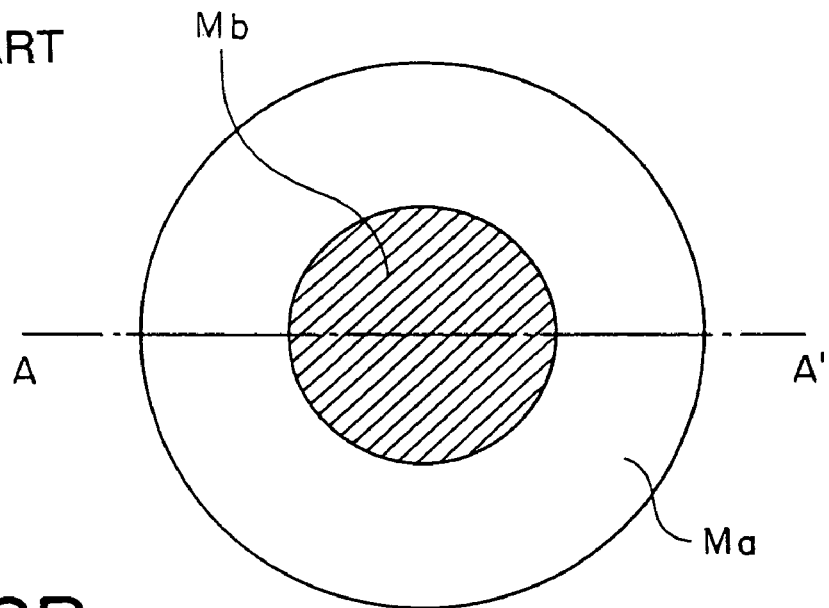
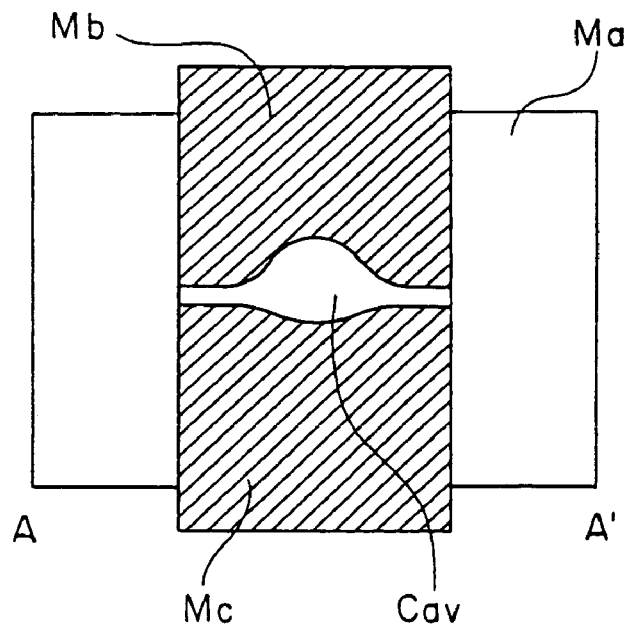

LENS AND COMBINATION LENS

TECHNICAL FIELD

The present invention relates to a lens, a combination lens, a method of producing the same, an optical pickup device, and an optical disk drive, more particularly relates to an optical disk drive and an optical pickup device for an optical disk able to realize a high recording density, a lens and combination lens to be mounted in these devices as object lenses, and a method of producing the same.

BACKGROUND ART

In recent years, in the field of information recording, research concerning optical information recording systems has been going on in many places. The optical information recording system has many advantages such as the ability to record and/or reproduce information without contact and the ability to handle read only type, writable type, and rewritable type memory formats. Broad applications from industrial use to consumer use are conceivable for this as a system enabling realization of inexpensive large sized files.

In the optical pickup mounted in a recording and/or reproduction apparatus of a CD (compact disk), DVD (digital versatile disk), or other optical recording medium (hereinafter also referred to as an "optical disk") for the above various types of optical information recording systems (hereinafter also referred to as an "optical disk drive"), laser light of a wavelength of for example 780 nm or 650 nm is emitted from a laser diode and focused on an optical recording layer of the optical disk by an optical system including a beam splitter and other optical members. Light reflected from the optical disk follows a reverse path in the above optical system and is projected onto a photodiode or other light receiving element by a multi lens or the like.

Information recorded on the optical recording layer of the optical disk is read from the changes in the light reflected from the optical disk.

The optical disk drive described above has, in the usual configuration, a light source for emitting light of a wavelength λ, an optical system including an object lens (condensing lens) having a numerical aperture NA for focusing the light emitted by the light source on the optical recording layer of a optical recording medium, a light receiving element for detecting the light reflected from the optical recording layer, and the like.

In the above optical disk drive, a spot size φ of the light on the optical recording layer is generally given by the following equation (1):

$$\phi = \lambda/NA \quad (1)$$

The spot size φ of the light has a direct influence upon the recording density of the optical recording medium. The smaller the spot size φ, the higher the recording density possible and the larger the capacity.

Namely, this shows that the shorter the wavelength λ of the light or the larger the numerical aperture NA of the object lens, the smaller the spot size φ, so a higher recording density is possible.

According to the above indicator, in order to realize a larger capacity of an optical disk, an optical disk drive wherein for example the wavelength of the light source is shortened from green to blue and further to an ultraviolet ray region and the numerical aperture NA of the object lens is raised to for example about 0.8 to 2.5 is being investigated.

When the numerical aperture of the object lens becomes larger as described above, in general, the allowable disk tilt in the optical disk drive is reduced. Therefore, in order to cope with this, it becomes necessary to obtain an optical disk of a type wherein the thickness of a protective layer on a light incident side of the optical disk is made thinner down to about 1 μm to 0.1 mm.

An object lens having a numerical aperture NA raised to about 0.85 can be realized by for example a solid immersion lens (hereinafter also referred to as an "SIL")—one type of combination lens.

FIG. 1 is a sectional view of the schematic configuration of an SIL. The SIL is comprised by a first convex lens L1 and a second convex lens L2.

Further, FIG. 2A is a plan view of the first convex lens, and FIG. 2B is a sectional view along A-A' in FIG. 2A. Further, FIG. 2C is a sectional view of the second convex lens.

The first convex lens L1 is comprised of a lens body 1 provided with convex aspherical surfaces at both surfaces (1c, 1d), while the second convex lens L2 is comprised of a lens body 2 provided with a convex spherical surface at one surface 2c and with a flat surface FL at the other surface 2d.

The first convex lens L1 and the second convex lens L2 are arranged on an identical optical axis AX and comprised so that a laser beam LB from a light source LS passes through the first convex lens L1, then passes through the second convex lens L2 and is focused at a predetermined point on the optical axis AX at a side opposite to the first convex lens L1.

In order to make the aberration of the first convex lens L1 smaller, it is necessary to bring the centers of the convex aspherical surfaces provided at both surfaces (1c, 1d) into register with a high precision.

In order to realize this, a mold shown in FIG. 3 is used to form the first convex lens L1.

FIG. 3A is a plan view of the mold, while FIG. 3B is a sectional view along A-A' in FIG. 3A.

The mold is comprised of a cylindrical first mold Ma into which are inserted from above and below a pin-shaped second mold Mb and third mold Mc having aspherical concave surfaces. A space surrounded by the inside wall surfaces of the first mold Ma, second mold Mb, and third mold Mc becomes a molding cavity Cav.

To use the above mold to form the first convex lens L1, as shown in FIG. 4A, ball glass BG is placed in the cavity Cav, the mold is heated up to a temperature where the glass softens, then, as shown in FIG. 4B, the second mold Mb and the third mold Mc are pressed from above and below to form the lens.

The above mold is structured with center axes of the cylindrical first mold Ma and pin-shaped second mold Mb and third mold Mc in register, so it is relatively easy to bring the centers of the convex aspherical surfaces provided at both surfaces of the first convex lens into register with a high precision during the processing.

Further, in order to make the aberration of the SIL comprised of the first convex lens L1 and the second convex lens L2 smaller, it is necessary to make the inclination of the optical axis of the first convex lens L1 and the second convex lens L2 as small as possible.

As shown in FIG. 2B, however, in the first convex lens L1, the convexities provided at the two surfaces (1c, 1d) are aspherical surfaces, so the surfaces cannot be used as reference surfaces for positioning.

Accordingly, in order to secure a reference surface for positioning, the first convex lens L1 has been provided with a flange 1e having a flat surface FL at the outer circumference of the lens body 1 and the optical axis adjusted using the surface of the flange 1e as a reference.

In recent years, however, the numerical aperture of lenses has become increasingly larger. At the same time, an extremely high precision is now being demanded in the adjustment of the optical axis.

For this reason, high precision adjustment satisfying the demands by only using a small area of flange portion provided at the outer circumference of the lens body as a reference surface as described above is becoming impossible.

As one method for solving this problem, there is the method of simultaneously forming a plurality of combination lenses. This will be explained below.

FIG. 5 is a sectional view of the schematic configuration of a combination lens (SIL) formed by the above method. The SIL is comprised of a first convex lens L1 and a second convex lens L2.

Further, FIG. 6A is the perspective view of the first convex lens, and FIG. 6B is a perspective view of the second convex lens.

The first convex lens L1 is comprised of the surface of a concavity 1a having a convex bottom provided at an upper surface of the lens body 1 and the surface of a concavity 1b provided at a lower surface of the lens body 1. These upper surface $S_D$ and a lower surface $S_A$ of the lens body 1 except for the concavities (1a, 1b) are flat surfaces able to serve as reference surfaces.

On the other hand, the second convex lens L2 is comprised of the surface of a concavity 2a provided at the upper surface of the lens body 2 and the lower surface of the lens body 2. These upper surface $S_B$ and lower surface $S_C$ of the lens body 2 except for the concavity 2a are flat surfaces able to serve as reference surfaces.

The first convex lens L1 and the second convex lens L2 are arranged on the identical optical axis AX. The lower surface $S_A$ of the lens body 1 and the upper surface $S_B$ of the lens body 2 are fixed by bonding. They are configured so that a laser beam LB from the light source LS passes through the first convex lens L1, then passes through the second convex lens L2 and is focused at a predetermined point on the optical axis AX at a side opposite to the first convex lens L1.

The method of production of the above SIL will be explained below.

First, the mold shown in FIG. 7A is used to form a first lens aggregate 10 comprised of a plurality of the above first convex lenses joined together. FIG. 7B is a sectional view of the first lens aggregate 10 formed in this way, and FIG. 7C is a plan view. The section along A-A' in FIG. 7C corresponds to FIG. 7B.

The above mold has a first mold $M_1$ and a second mold $M_2$. Through holes are formed at predetermined positions. Pin molds $P_{1b}$ having convex surfaces at their front ends are inserted into the first mold $M_1$, while pin molds $P_{1a}$ having concave surfaces at their front ends are inserted into the second mold $M_2$. Further, positioning mark pins $P_{11}$ are inserted in the second mold $M_2$.

A space surrounded by the inside wall surfaces of the first mold $M_1$, second mold $M_2$, pin molds $P_{1a}$, pin molds $P_{1b}$, and positioning mark pins $P_{11}$ becomes the molding cavity Cav.

By filling the interior of the mold having the above configuration by softened glass or another optical material, a first lens aggregate 10 comprised of a plurality of (nine in the figure) first convex lenses formed with concavities 1a having convex bottoms and concavities 1b forming first convex lenses L1 joined together and provided with positioning marks 11 as shown in FIG. 7B and FIG. 7C is formed.

On the other hand, a mold and method similar to those described above are used to form a second lens aggregate 20 comprised of a plurality of (nine in the figure) second convex lenses formed with concavities 2a forming the second convex lens L2 joined together and provided with positioning marks 21.

The first lens aggregate 10 and the second lens aggregate 20 obtained as described above are adhered together by superimposing the positioning marks (11, 21) and using an adhesive or the like.

In steps after this, the aggregate is divided into individual SILs having predetermined sizes as shown in FIG. 5 by predetermined division lines.

According to the above method of production of an SIL, when adhering together the first lens aggregate 10 and the second lens aggregate 20, the positioning can be carried out using the large area bottom surface of the first lens aggregate 10 and top surface of the second lens aggregate 20 as the reference surfaces, so it is possible to easily form the SIL with an extremely high accuracy while eliminating inclination of the optical axes of the first convex lens L1 and the second convex lens L2 without adjustment requiring a high level of skill.

However, in the mold for forming the first lens aggregate forming first convex lenses L1, through holes are provided in the first mold $M_1$ and the second mold $M_2$ at the positions forming the first convex lenses and pin molds $P_{1b}$ and pin molds $P_{1a}$ are inserted into them. In order to form the first convex lenses L1 with a high precision, it is necessary to bring the center axes of the pin molds $P_{1b}$ and the pin molds $P_{1a}$ into register. As shown in FIG. 7, however, in a general mold structure, the first mold $M_1$ and the second mold $M_2$ having the through holes for insertion of the pin molds $P_{1b}$ and the pin molds $P_{1a}$ are formed separately and then combined, so it is very difficult to match the center axes of the pin molds $P_{1b}$ and the pin molds $P_{1a}$ and therefore it has become difficult to obtain high precisely formed first convex lenses.

DISCLOSURE OF THE INVENTION

The present invention was made in consideration of the above circumstance. Accordingly, an object of the present invention is to provide a lens able to suppress misalignment of the optical axis of the lens occurring at the time of combination and able to be adjusted at a high precision in a combination lens obtained by combining a plurality of lenses formed by a mold with common optical axes, such a combination lens, a method of producing the combination lens, and an optical pickup device and an optical disk drive mounting the combination lens.

To attain the above object, the lens of the present invention comprises a lens body wherein one surface of an incident side or an emitting side of light is a flat surface and the other surface parallel to the surface formed as the flat surface is a structural element.

In the lens of the present invention, since one surface of the incident side or the emitting side of the light of the lens body is a flat surface, it is unnecessary to bring the center portions of two curved surfaces into register as in the case where both of the incident side and the emitting side are curved surfaces. Further, even when combined with another lens to form a combination lens, the above flat surface can be used as a reference surface. It is therefore possible to suppress misalignment of the optical axes of the lenses occurring at the time of combination and make adjustments with a high precision.

Further, to attain the above object, the combination lens of the present invention is formed by adhering together a first lens comprising a lens body wherein one surface of an incident side or an emitting side of light is a flat surface and the other surface parallel to the surface formed as the flat surface is a structural element and a second lens comprising a lens body wherein one surface of an incident side or an emitting side of light is a flat surface and the other surface parallel to the surface formed as the flat surface is a structural element.

The combination lens of the present invention is preferably obtained by adhering together the flat surface of the first lens and the other surface parallel to the surface formed as the flat surface of the second lens.

Alternatively preferably, it is obtained by adhering together the other surface parallel to the surface formed as the flat surface of the first lens and the other surface parallel to the surface formed as the flat surface of the second lens.

Further, to attain the above object, the combination lens of the present invention is formed by adhering together a first lens comprising a lens body wherein one surface of an incident side or an emitting side of light is a flat surface and a second lens comprising a lens body wherein one surface of an incident side or an emitting side of light is a flat surface and the other surface parallel to the surface formed as the flat surface is a structural element.

The combination lens of the present invention is preferably obtained by adhering together the flat surface of the first lens and the other surface parallel to the surface formed as the flat surface of the second lens.

Alternatively preferably, it is obtained by adhering together the flat surface of the first lens and the flat surface of the second lens.

Further, to attain the above object, the combination lens of the present invention is a combination lens comprising a first convex lens and a second convex lens sharing an optical axis and comprised so that a light beam from a light source passes through the first convex lens, then passes through the second convex lens and is focused on a predetermined point on the optical axis at a side opposite to the first convex lens, wherein the surface of the lens body forming the first convex lens on the emitting side of the light beam is a flat surface.

In the above combination lens of the present invention, preferably the surface of the lens body forming the first convex lens on the emitting side of the light beam and the surface of the lens body forming the second convex lens on the emitting side of the light beam are flat surfaces.

The combination lens of the present invention is comprised by adhering a first lens forming the combination lens to a second lens using a lens comprised of a lens body where one surface on the incident side or the emitting side of the light is a flat surface.

In the first lens, it is unnecessary to bring the center portions of two curved surfaces into register as in the case where both of the incident side and the emitting side are curved surfaces. Further, even when combined with a second lens to form a combination lens, the above flat surface can be used as a reference surface.

Further, by using as the second lens as well a lens comprising a lens body where one surface on the incident side or the emitting side of the light is a flat surface and the other surface parallel to the surface formed as the flat surface is the structural element, it is unnecessary to bring the center portions of two curved surfaces into register as in the case where both of the incident side and the emitting side are curved surfaces. Further, even when combined with the first lens to form a combination lens, the above flat surface can be used as a reference surface.

Accordingly, this becomes a combination lens able to suppress misalignment of the optical axes of the lenses occurring at the time of combination and able to be adjusted with a high precision.

Further, to attain the above object, the method of producing a combination lens of the present invention comprises a step of forming a first lens aggregate integrally forming a plurality of first lenses, each comprising a lens body where one surface on the incident side or the emitting side of light is a flat surface and the other surfaces parallel to the surface formed as the flat surface is a structural element, so as to share the flat surface and the other surface parallel to the surface formed as the flat surface and provided with positioning marks; a step of forming a second lens aggregate integrally forming a plurality of second lenses, each comprising a lens body where one surface on the incident side or the emitting side of light is a flat surface and the other surfaces parallel to the surface formed as the flat surface is a structural element, so as to share the flat surface and the other surface parallel to the surface formed as the flat surface and provided with positioning marks; a step of adhering together the first lens aggregate and the second lens aggregate while positioning together the positioning marks; and a step of dividing an adhered body of the first lens aggregate and the second lens aggregate obtained as described above into individual combination lenses formed as adhered bodies of the first lenses and the second lenses.

In the method of producing a combination lens of the present invention, preferably the step of adhering together the first lens aggregate and the second lens aggregate comprises adhering together the flat surfaces of the first lenses and the other surfaces of the second lenses parallel to the surfaces formed as the flat surfaces.

Alternatively, preferably, the step of adhering together the first lens aggregate and said second lens aggregate comprises adhering together the other surfaces of said first lenses parallel to the surfaces formed as said flat surfaces and the other surfaces of said second lenses parallel to the surfaces formed as said flat surfaces.

Further, to attain the above object, the method of producing a combination lens of the present invention comprises a step of forming a first lens aggregate integrally forming a plurality of first lenses, each comprising a lens body where one surface on the incident side or the emitting side of light is a flat surface, so as to share the flat surface and provided with positioning marks; a step of forming a second lens aggregate integrally forming a plurality of second lenses, each comprising a lens body where one surface on the incident side or the emitting side of light is a flat surface and the other surfaces parallel to the surface formed as the flat surface is a structural element, so as to share the flat surface and the other surface parallel to the surface formed as the flat surface and provided with positioning marks; a step of adhering together the first lens aggregate and the second lens aggregate while positioning together the positioning marks; and a step of dividing an adhered body of the first lens aggregate and the second lens aggregate obtained as described above into individual combination lenses formed as adhered bodies of the first lenses and the second lenses.

In the method of producing a combination lens of the present invention, preferably the step of adhering together the first lens aggregate and the second lens aggregate comprises adhering together the flat surfaces of the first lenses and the other surfaces of said second lenses parallel to the surfaces formed as the flat surfaces.

Alternatively, preferably, the step of adhering together the first lens aggregate and the second lens aggregate comprises adhering together the flat surfaces of the first lenses and the flat surfaces of the second lenses.

The method of producing a combination lens of the present invention forms a first lens aggregate integrally forming a plurality of first lenses and provided with positioning marks.

Next, it forms a second lens aggregate integrally forming a plurality of second lenses and provided with positioning marks.

Next, it adheres the first lens aggregate and the second lens aggregate while positioning together the positioning marks.

Next, it divides the obtained adhered body of the first lens aggregate and the second lens aggregate into individual combination lenses formed as adhered bodies of the first lenses and second lenses.

According to the method of producing a combination lens of the present invention, each of the first lenses comprises a lens body where at least one surface on the incident side or the emitting side of the light is a flat surface, and the first lens aggregate comprising these joined together has a large area of reference surface comprising these flat surfaces. On the other hand, each of the second lenses comprises a lens body where one surface on the incident side or the emitting side of the light is a flat surface and the other surface parallel to the surface formed as the flat surface is a structural element, and the second lens aggregate comprising these joined together also has a large area of reference surface.

By adhering together these reference surfaces, it is possible to suppress misalignment of the optical axes of the lenses. Further, since the positioning marks are positioned together, it is possible to adhere members while defining their positions with a high precision.

Accordingly, it is possible to produce a combination lens able to suppress misalignment of the optical axes of the lenses occurring at the time of combination and able to be adjusted with a high precision.

Further, to attain the above object, the optical pickup device of the present invention is an optical pickup device receiving light reflected when focusing light on an optical recording layer of an optical recording medium, comprising a light emitting unit for emitting light, a light receiving unit for receiving light emitted from the light emitting unit, and an optical member for focusing the light emitted from the light emitting unit to the optical recording layer of the optical recording medium and coupling the light reflected from the optical recording medium with the light receiving unit, wherein the optical member includes as a lens for focusing the light emitted from the light emitting unit on the optical recording layer a combination lens comprising a first convex lens and a second convex lens sharing an optical axis and comprised so that light from the light emitting unit passes through said first convex lens, then passes through the second convex lens and is focused on the optical recording layer on the optical axis at a side opposite to the first convex lens, in the combination lens, the surface of the lens body forming the first convex lens on the emitting side of the light being a flat surface.

It is possible to use a combination lens able to suppress misalignment of the optical axes of lenses occurring at the time of combination and able to be adjusted with a high precision so to form an optical pickup device mounting an object lens having a high numerical aperture able to handle greater capacities.

Further, to attain the above object, the optical disk drive of the present invention is an optical disk drive receiving light reflected when focusing light on an optical recording layer of an optical recording medium to reproduce information recorded on the optical recording layer of the optical recording medium, comprising a drive unit for rotating the optical recording medium, a light emitting unit for emitting the light, a light receiving unit for receiving the light emitted from the light emitting unit, and an optical member for focusing the light emitted from the light emitting unit to the optical recording layer of the optical recording medium and coupling the light reflected from the optical recording medium with the light receiving unit, wherein the optical member includes as a lens for focusing the light emitted from the light emitting unit on the optical recording layer a combination lens comprising a first convex lens and a second convex lens sharing an optical axis and comprised so that light from the light emitting unit passes through the first convex lens, then passes through the second convex lens and is focused on the optical recording layer on the optical axis at a side opposite to the first convex lens, in the combination lens, the surface of the lens body forming the first convex lens on the emitting side of the light being a flat surface.

It is possible to use a combination lens able to suppress misalignment of the optical axes of lenses occurring at the time of combination and able to be adjusted with a high precision so to form an optical disk drive mounting an object lens having a high numerical aperture able to handle greater capacities.

BRIEF DESCRIPTION OF THE DRAWINGS

FIG. 3A is a plan view of a mold for forming a first convex lens according to the first example of the prior art, and FIG. 3B is a sectional view along A-A' in FIG. 3A.

FIGS. 4A and 4B are sectional views showing production steps of a method of producing a combination lens according to the first example of the prior art, wherein FIG. 4A shows the state up to a step of placing ball glass into the mold (cavity), and FIG. 4B shows the state up to a step of elevating a temperature of the mold and pressing a second mold and a third mold from above and below.

BEST MODE FOR CARRYING OUT THE INVENTION

Below, an explanation will be given of a lens, a combination lens, a method of producing a combination lens, an optical pickup device, and an optical disk drive of the present invention with reference to the drawings.

First Embodiment

Figure 1:
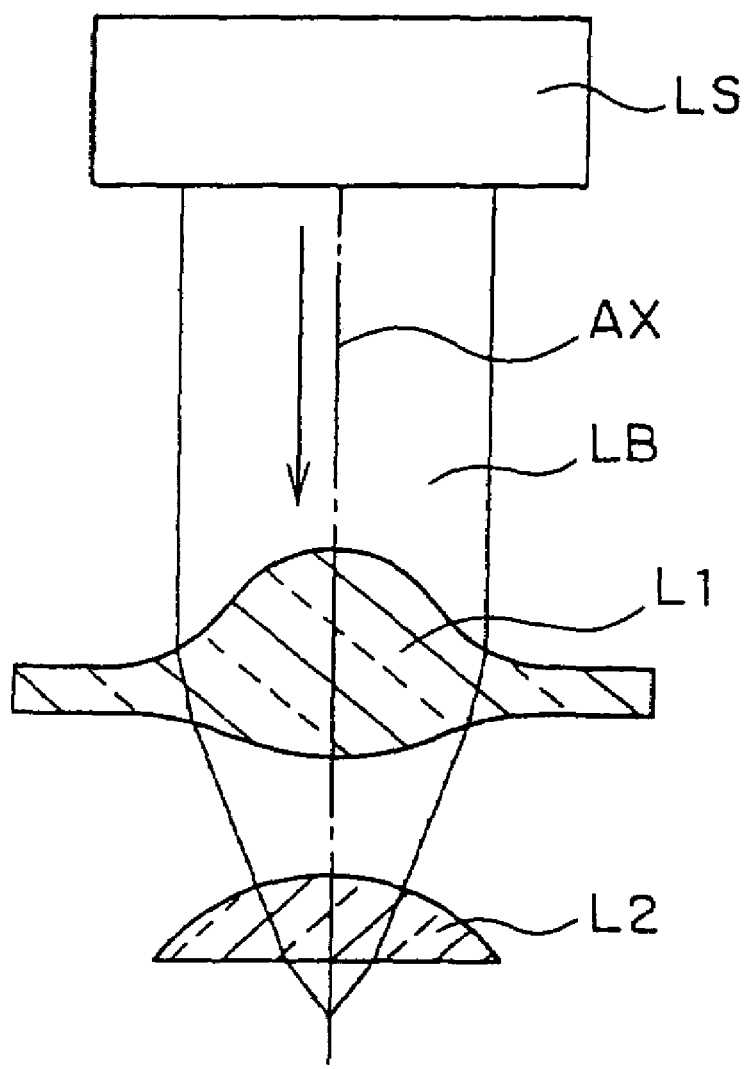
FIG. 1 is a sectional view of a schematic configuration of a combination lens (SIL) according to a first example of the prior art.
Figure 2A:
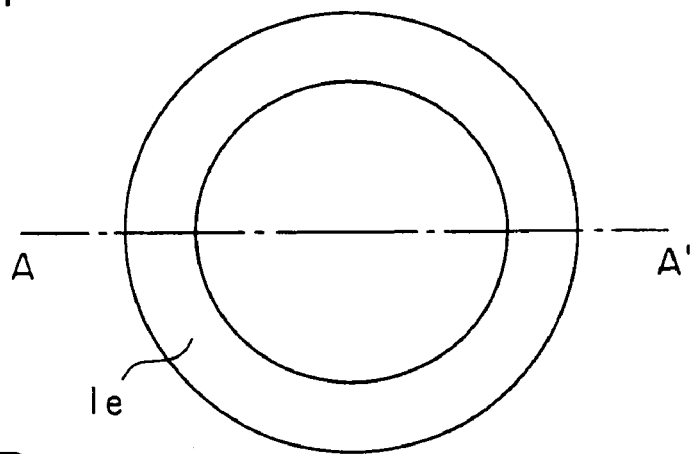
FIG. 2A is a plan view of a first convex lens according to the first example of the prior art.
Figure 2B:
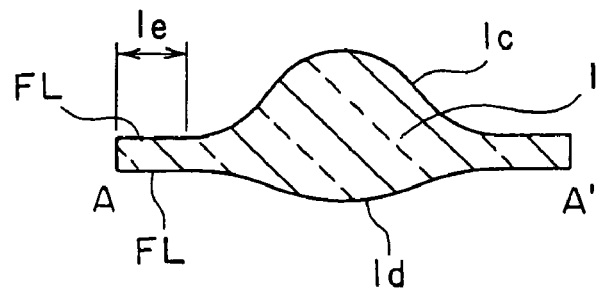
FIG. 2B is a sectional view along A-A' in FIG. 2A.
Figure 2C:
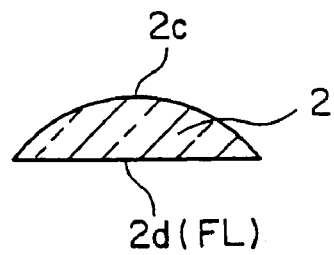
FIG. 2C is a sectional view of a second convex lens.
Figure 4A:
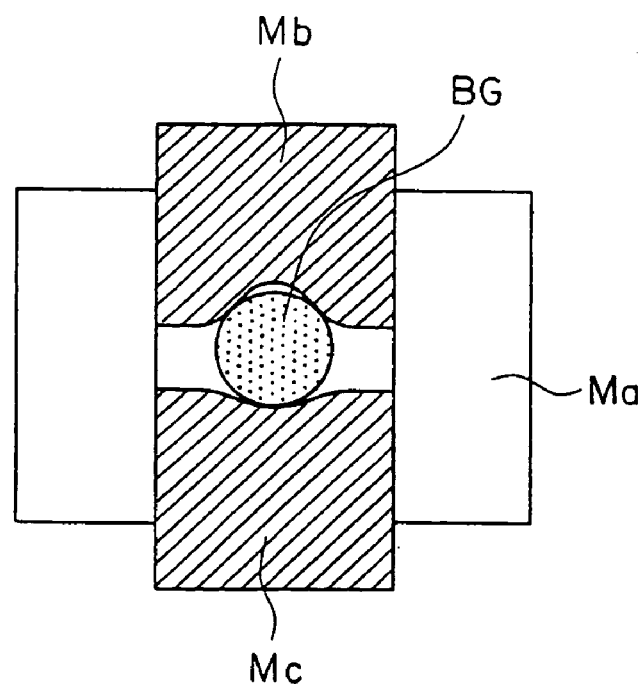
Figure 4B:
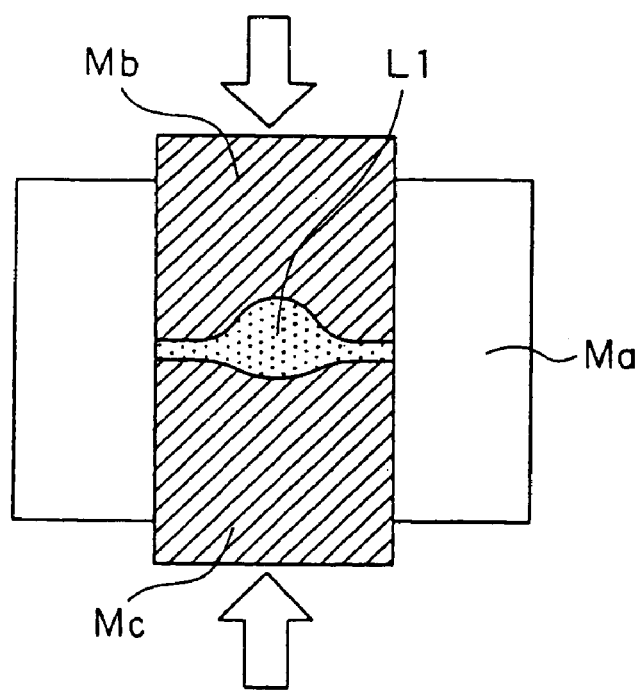
Figure 5:
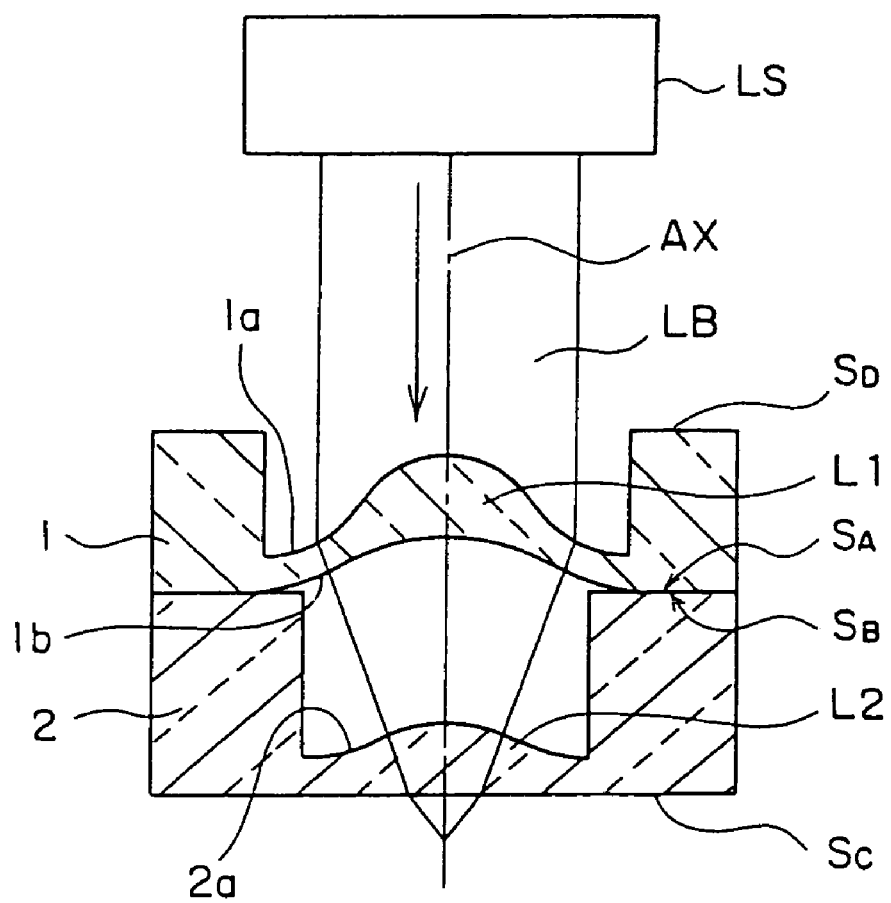
FIG. 5 is a sectional view of the schematic configuration of a combination lens (SIL) according to a second example of the prior art.
Figure 6A:
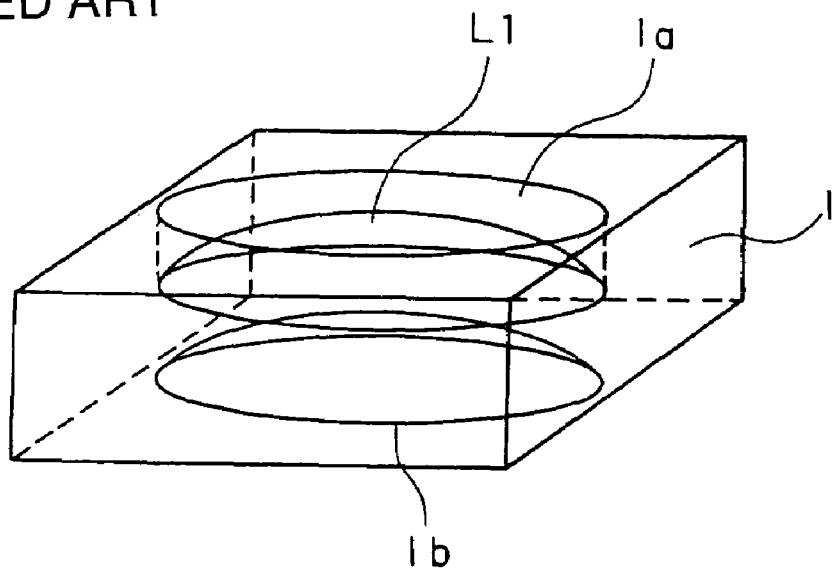
FIG. 6A is a perspective view of a first convex lens according to the second example of the prior art.
Figure 6B:
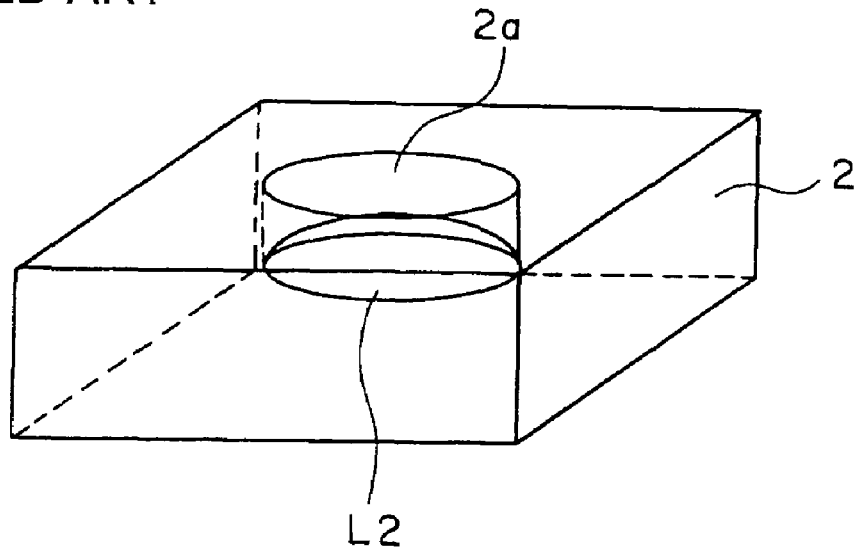
FIG. 6B is a perspective view of a second convex lens.
Figure 7A:
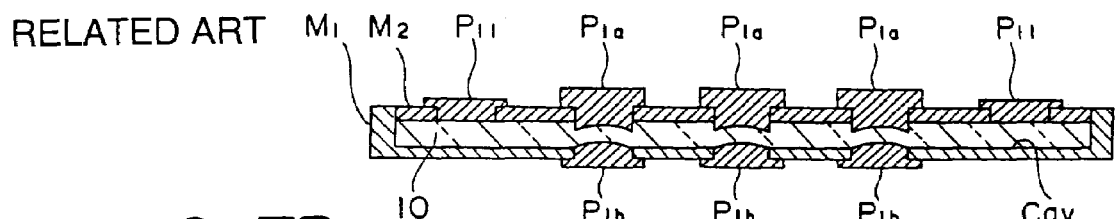
FIG. 7A is a schematic configuration view of a mold for forming a first lens aggregate in a method of producing a combination lens according to the second example of the prior art.
Figure 7B:
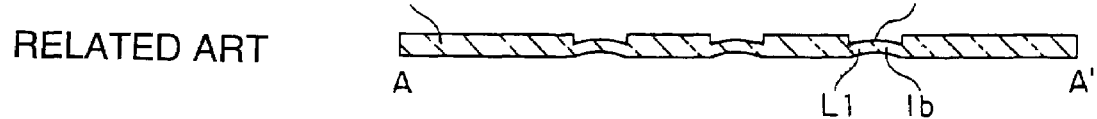
FIG. 7B is a sectional view of the first lens aggregate.
Figure 7C:
FIG. 7C is a plan view thereof.
Figure 8:
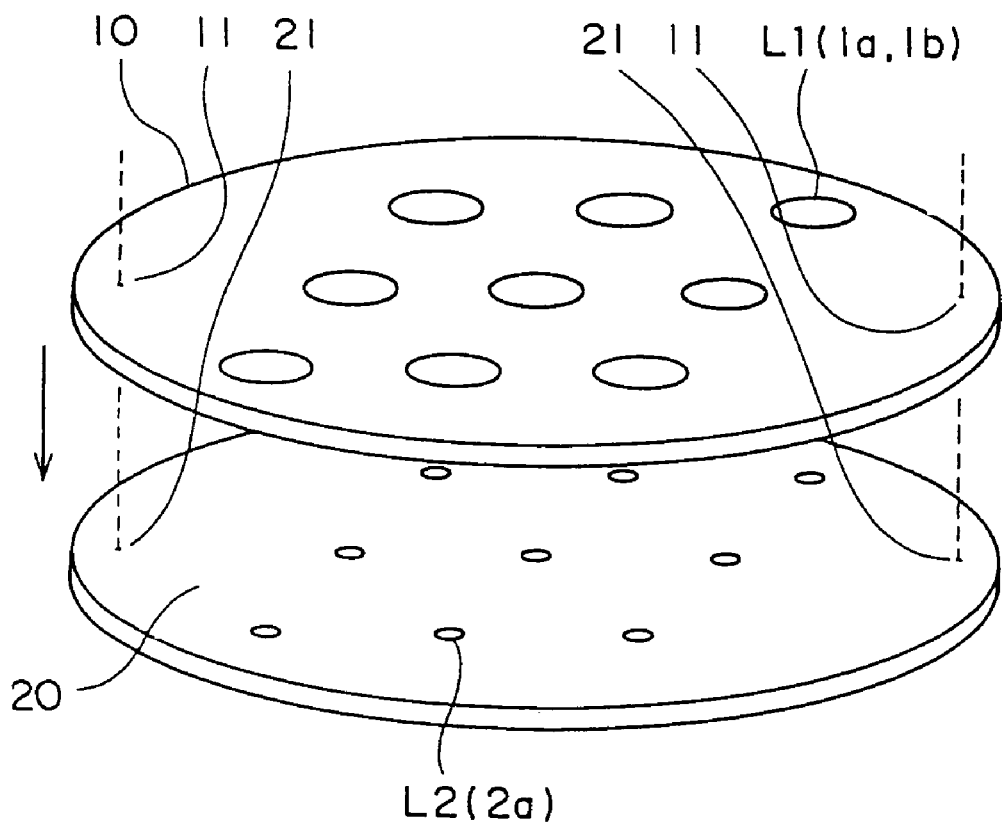
FIG. 8 is a perspective view of the step of adhering together the first lens aggregate and the second lens aggregate in the method of producing a combination lens according to the second example of the prior art.
Figure 9:
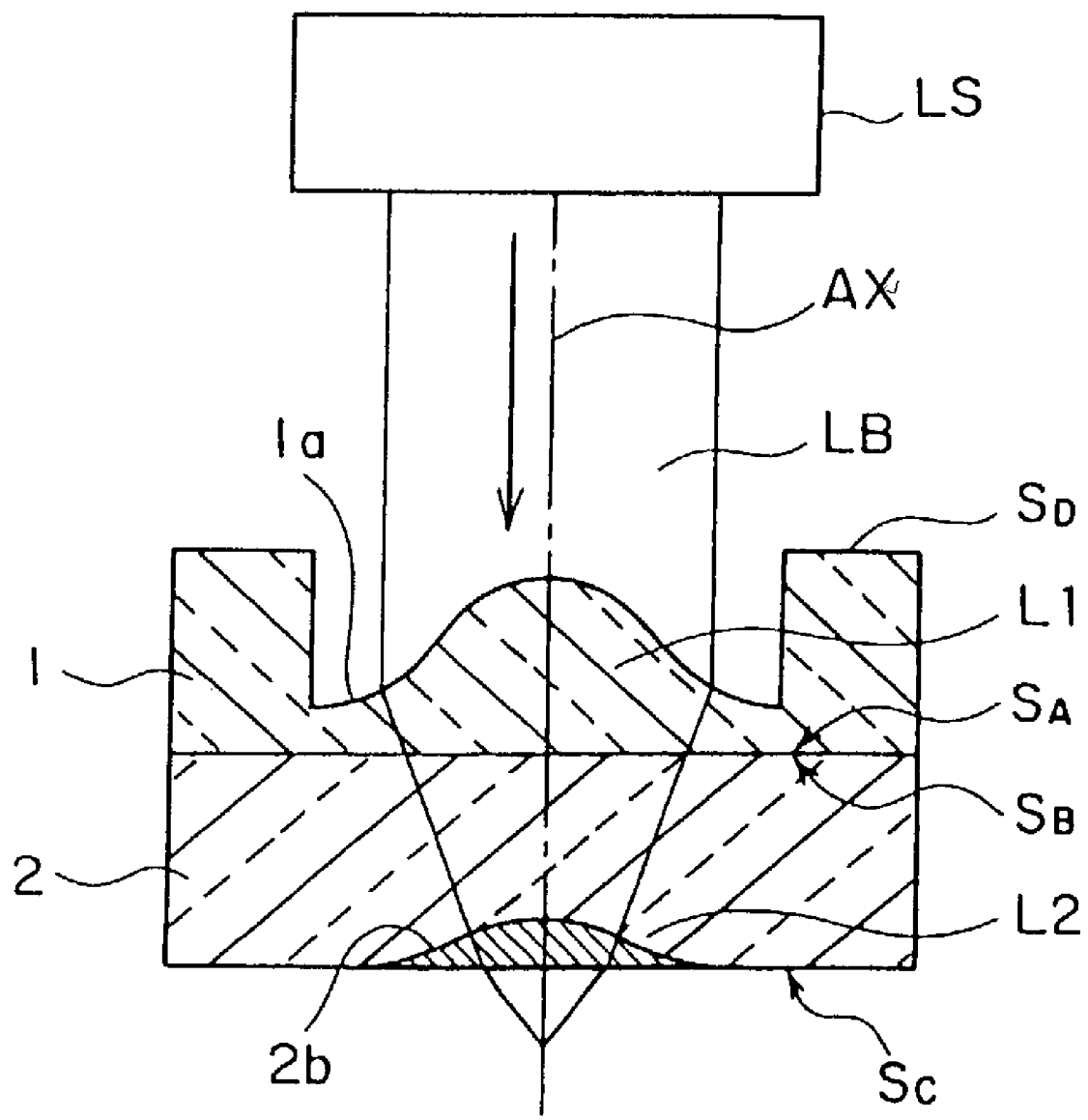
FIG. 9 is a sectional view of the schematic configuration of a combination lens (SIL) according to a first embodiment.

FIG. 9 is a sectional view of the schematic configuration of a combination lens (SIL) according to the present embodiment. The SIL is structured by a first convex lens L1 and a second convex lens L2.

Figure 10A:
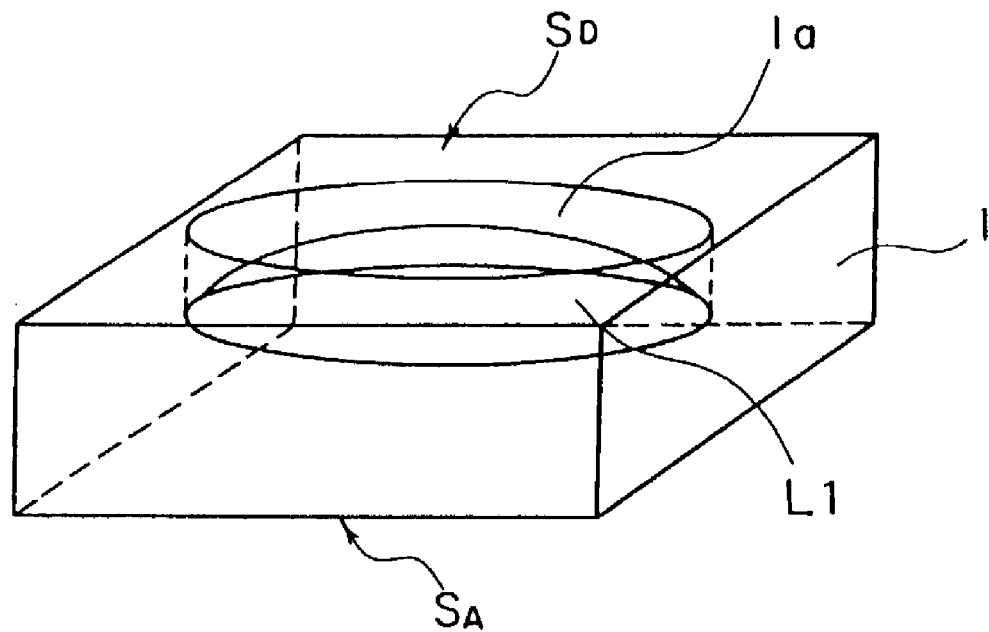
FIG. 10A is a perspective view of the first convex lens according to the first embodiment.
Figure 10B:
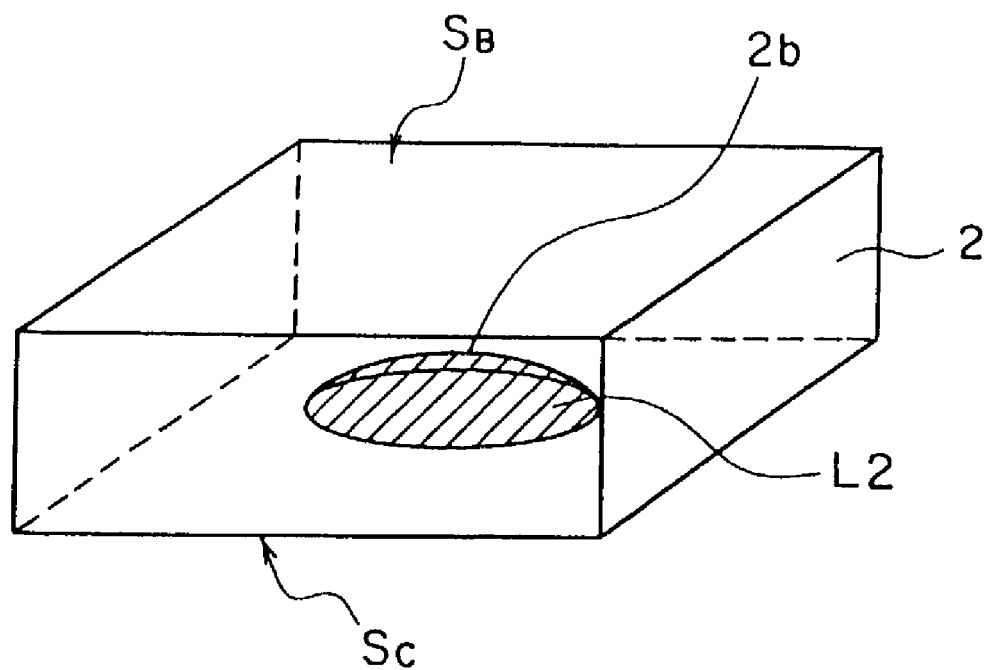
FIG. 10B is a perspective view of the second convex lens.

Further, FIG. 10A is a perspective view of the first convex lens, and FIG. 10B is a perspective view of the second convex lens.

The first convex lens L1 is comprised by the surface of a concavity 1a having a convex bottom provided at an upper surface of a lens body 1 made of glass or another optical material and the lower surface of the lens body 1. The upper surface $S_D$ and the lower surface $S_A$ of the lens body 1 of the portion other than at this concavity 1a are flat surfaces able to serve as reference surfaces.

On the other hand, the second convex lens L2 is comprised by burying a material having a higher refractive index than the lens body 2 in a concavity 2b provided in the lower surface of a lens body 2 made of glass of another optical material.

The upper surface $S_B$ and the lower surface $S_C$ of the lens body 2 of the portion other than at this concavity 2b of the lens body 2 are flat surfaces able to serve as reference surfaces.

The first convex lens L1 and the second convex lens L2 are arranged on the identical optical axis AX, and the lower surface $S_A$ of the lens body 1 and the upper surface $S_B$ of the lens body 2 are fixed by bonding, so that a light beam LB from the light source LS passes through the first convex lens L1, then passes through the second convex lens L2 and is focused on a predetermined point on the optical axis AX at the side opposite to the first convex lens L1.

In the SIL of the present embodiment the first convex lens is a lens where the surface of the lens body on the emitting side of the light is a flat surface and the second convex lens is also a lens where the surface of the lens body on the incident side of the light is a flat surface.

There is no need to bring the center portions of two curved surfaces into register as in the case where both of the lenses have both the incident side and the emitting side as curved surfaces. By adhering together the flat surfaces as described above, it is possible to suppress misalignment of the optical axes of lenses occurring at the time of combination and make adjustments with a high precision.

The method of producing the SIL will be explained below.

Figure 11A:
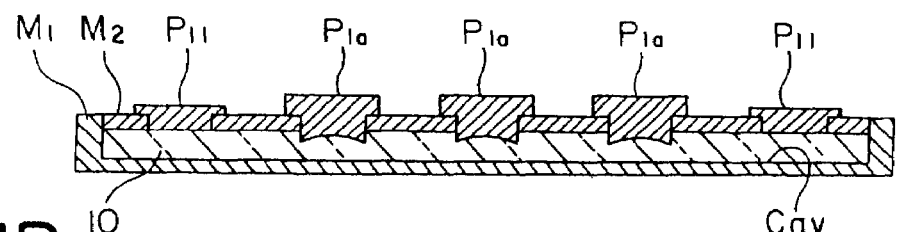
FIG. 11A is a schematic configuration view of the mold for forming the first lens aggregate in the method of producing a combination lens according to the first embodiment.
Figure 11B:
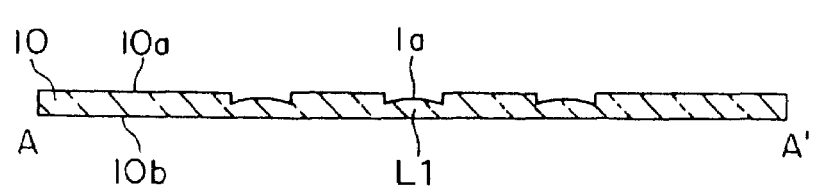
FIG. 11B is a sectional view of the first lens aggregate.
Figure 11C:
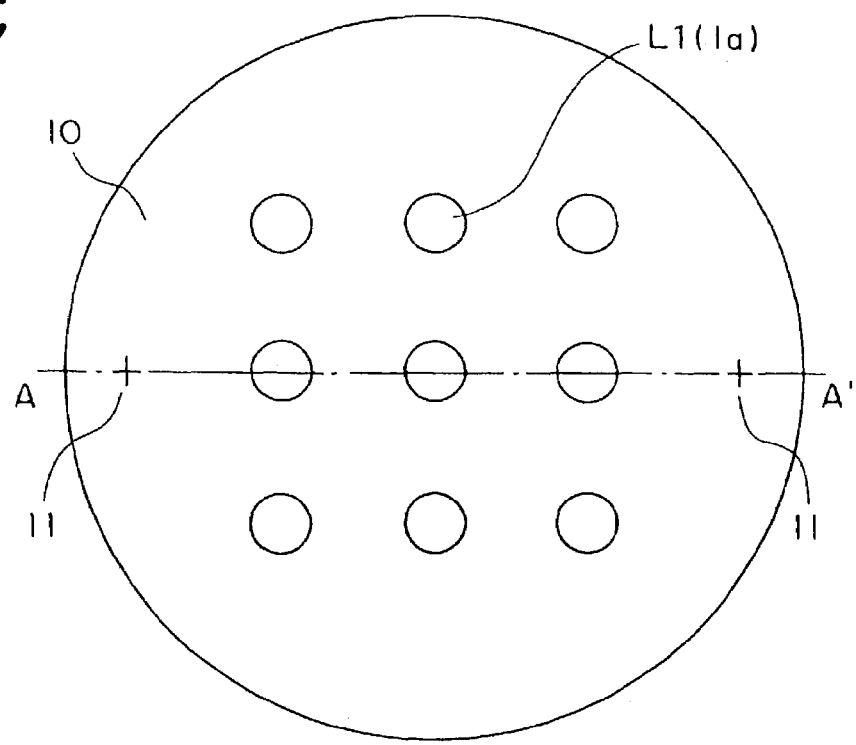
FIG. 11C is a plan view thereof.

First, the mold shown in FIG. 11A is used to form a first lens aggregate 10 integrally forming a plurality of the above first convex lenses. FIG. 11B is a sectional view of the first lens aggregate 10 formed in this way, while FIG. 11C is a plan view. The section along A-A' in FIG. 11C corresponds to FIG. 11B.

The above mold has the first mold $M_1$ and the second mold $M_2$. Through holes are formed at predetermined positions of the second mold $M_2$. Pin molds $P_{1a}$ having concave surfaces are their front ends and positioning mark pins $P_{11}$ are inserted through them.

A space surrounded by the inside wall surfaces of the first mold $M_1$, second mold $M_2$, pin molds $P_{1a}$, and positioning mark pins $P_{11}$ becomes the molding cavity Cav.

By filling the interior of the mold having the above structure by softened glass or another optical material, a first lens aggregate 10 integrally forming a plurality of (nine in the figure) first convex lenses formed with concavities 1a having bottom surfaces of a convex shape, serving as first convex lenses L1, and provided with positioning marks 11 as shown in FIG. 11B and FIG. 11C is formed. In the first lens aggregate 10, the concavities 1a and the positioning marks 11 are provided on the upper surface 10a side, and the lower surface 10b becomes the flat surface.

Figure 12A:
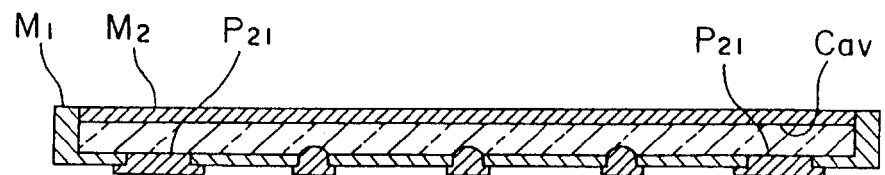
FIG. 12A is a schematic configuration view of the mold for forming the second lens aggregate in the method of producing a combination lens according to the first embodiment.
Figure 12B:
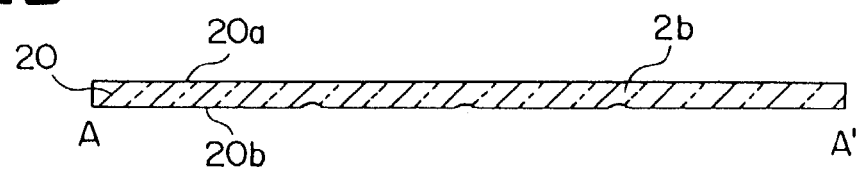
FIG. 12B is a sectional view of the second lens aggregate.
Figure 12C:
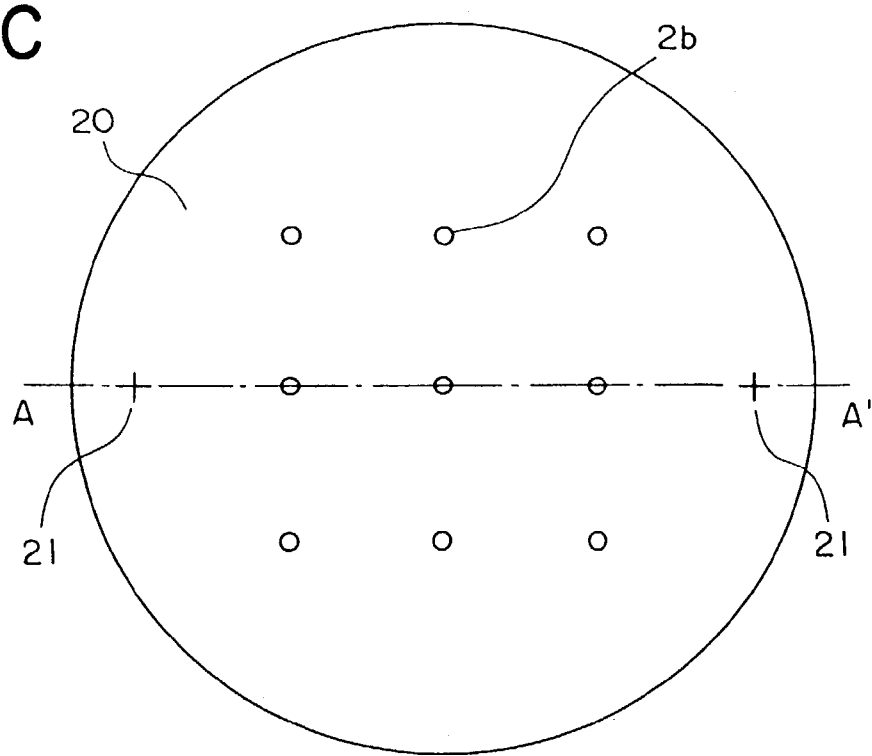
FIG. 12C is a plan view thereof.

On the other hand, in the same way as above, a second lens aggregate 20 integrally forming a plurality of the second convex lenses is formed using the mold shown in FIG. 12A. FIG. 12B is a sectional view of the second lens aggregate 20 formed in this way, and FIG. 12C is a plan view. The section along A-A' in FIG. 12C corresponds to FIG. 12B.

The above mold has a first mold $M_1$ and a second mold $M_2$. Through holes are formed at predetermined positions of the first mold $M_1$. Pin molds $P_{2b}$ having concave surfaces at their front end and positioning mark pins $P_{21}$ are inserted.

A space surrounded by the inside wall surfaces of the first mold $M_1$, second mold $M_2$, pin molds $P_{2b}$, and positioning mark pins $P_{21}$ becomes the molding cavity Cav.

By filling the interior of the mold having the above structure by softened glass or another optical material, as shown in FIG. 12B and FIG. 12C, concavities 2b for forming the second convex lenses L2 can be formed. By burying a high refractive index material in the concavities 2b, a second lens aggregate 20 integrally forming a plurality of (nine in the figure) second convex lenses and provided with positioning marks 21 is formed. In the second lens aggregate 20, the concavities 2b and the positioning marks 21 are provided on the lower surface 20b side, and the upper surface 20a becomes the flat surface.

Figure 13A:
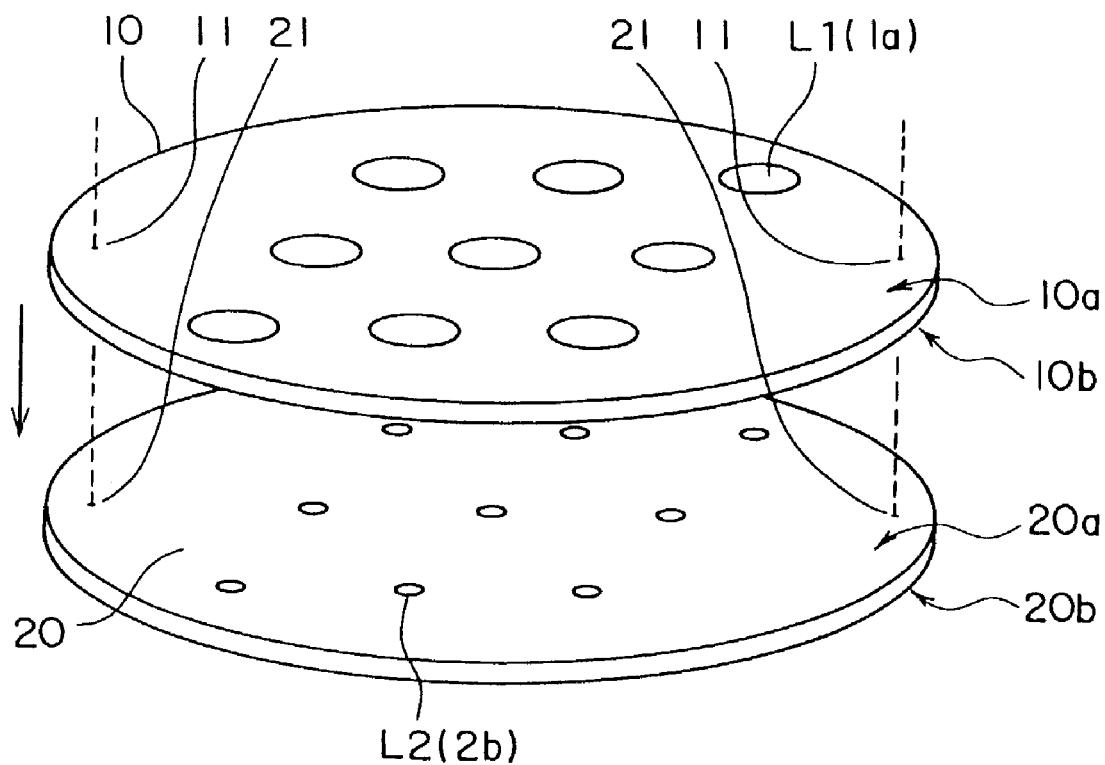
FIG. 13A is a perspective view of the step of adhering together the first lens aggregate and the second lens aggregate in the method of producing a combination lens according to the first embodiment.
Figure 13B:
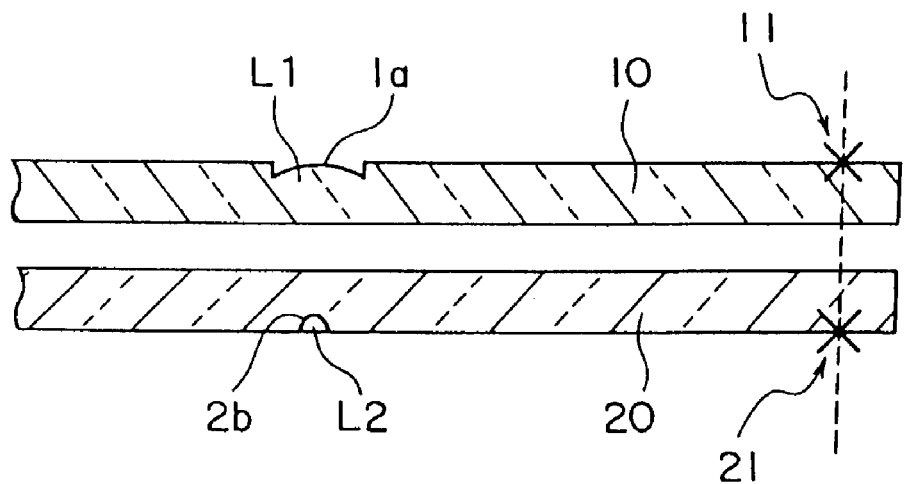
FIG. 13B is a sectional view showing the same step as that of FIG. 13A.

Next, as shown in the perspective view of FIG. 13A and the sectional view of FIG. 13B, the lower surface 10b formed as the flat surface of the first lens aggregate 10 obtained as described above and the upper surface 20a formed as the flat surface of the second lens aggregate 20 are adhered together by using a binder or the like while superimposing the positioning marks (11, 21).

Figure 13C:
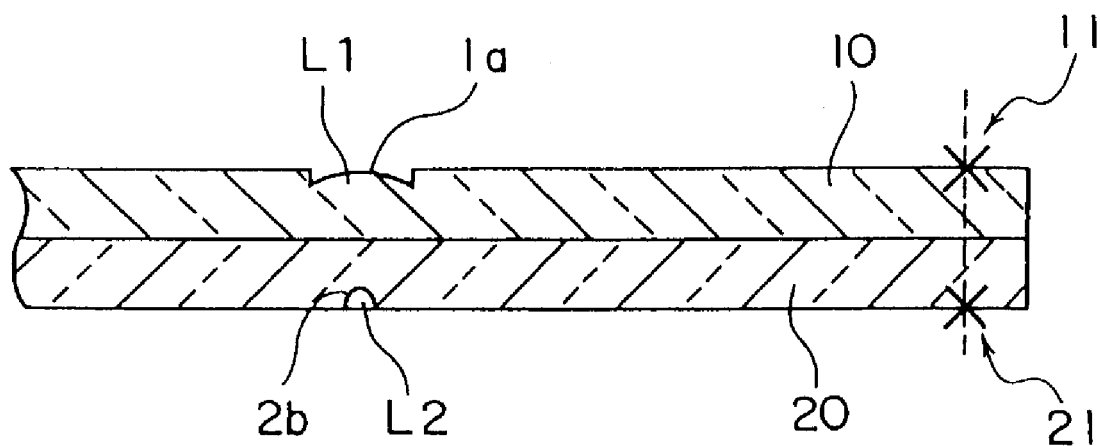
FIG. 13C is a perspective view showing the adhered body of the first lens aggregate and the second lens aggregate in the method of producing a combination lens according to the first embodiment.

The adhesion results in the structure shown in FIG. 13C.

Figure 13D:
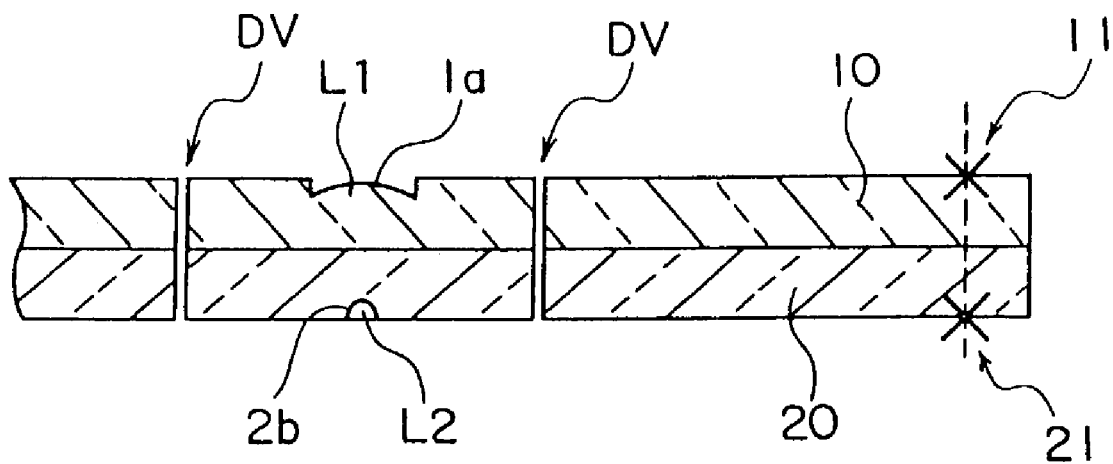
FIG. 13D is a sectional view showing a step of dividing it into individual combination lenses.

Next, as shown in FIG. 13D, the adhered member is divided into individual SILs having predetermined sizes along predetermined division lines DV to thereby form SILs as shown in FIG. 9.

According to the method of producing a SIL of the present embodiment, when adhering together the first lens aggregate 10 and the second lens aggregate 20, they can be positioned by using the large area of lower surface of the first lens aggregate 10 and upper surface of the second lens aggregate 20 as reference surfaces, therefore the SIL can be formed easily and extremely precisely while eliminating the inclination of the optical axes of the first convex lens L1 and the second convex lens L2 without adjustment requiring a high level of skill.

Further, in both of the first convex lens L1 and the second convex lens L2, one surface of the incident side or the emitting side of the light of the lens body is a flat surface. When producing a SIL by a mold process, it is unnecessary to bring the center portions of two curved surfaces into register as needed when both of the incident side and the emitting side are curved surfaces. Further, the flat surfaces can be used as reference surfaces when combining them with other lenses.

Accordingly, it is possible to suppress misalignment of the optical axes of the lenses occurring at the time of combination and make adjustments with a high precision to produce a combination lens.

Further, it is possible to assemble a large number of lenses at one time.

Second Embodiment

Figure 14:
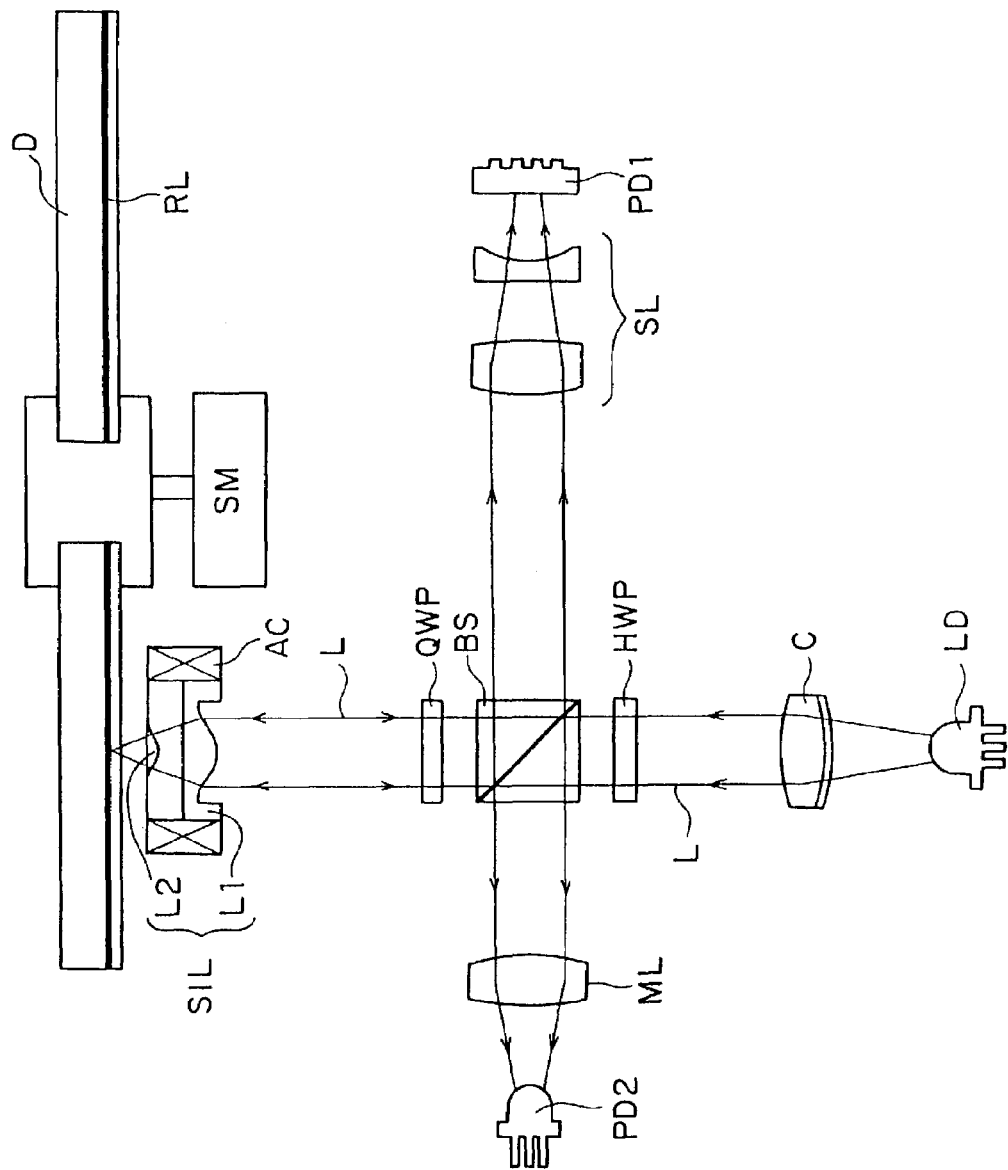
FIG. 14 is a view of the configuration of an optical pickup device according to a second embodiment.

FIG. 14 is a view of the schematic configuration of an optical pickup device serving as a principal part of an optical disk drive according to the present embodiment.

For example, a laser diode LD, a collimator C, a half wavelength plate HWP, a beam splitter BS, a quarter wavelength plate QWP, an SIL (L1, L2) provided at an actuator AC and forming an object lens, a servo and RF use optical lens SL, a first photodiode PD1, a monitor use lens ML, and a second photodiode PD2 are arranged at predetermined positions with respect to an optical disk D driven to rotate by the spindle motor SM.

The laser light L emitted from the laser diode LD is converted to parallel light by the collimator C, then passes through the half wavelength plate HWP and strikes the beam splitter BS.

The incident light, except for part, passes through the beam splitter BS and the quarter wavelength plate QWP, is focused using the combination lens according to the first embodiment, that is, the SIL, as an object lens, and strikes as a spot the optical recording layer RL of the optical disk D rotated by the spindle motor SM.

Light L reflected from the optical recording layer RL of the optical disk D follows a path reverse to the incident route to strike the beam splitter BS, is reflected at its beam splitting surface, is focused by the servo and RF use optical lens SL, and strikes the first photodiode PD1, where the reflected light is observed.

On the other hand, part of the laser light L emitted from the laser diode LD is reflected at the beam splitting surface of the beam splitter BS, is focused by the monitor use lens ML, and strikes the second photodiode PD2, where the intensity of the laser light is monitored.

The first photodiode observes the reflected light L and generates an RF signal for the reflected light L by a not illustrated predetermined processing circuit or the like.

Due to this, data recorded at the optical recording layer RL of the optical disk D can be reproduced.

Further, at the same time as the generation of the RF signal, a not illustrated matrix circuit and compensation circuit or other predetermined processing circuit generates a focus error signal and a tracking error signal for focus servo and tracking servo control.

For the detection of the focus error signal and the detection of the tracking error signal, conventionally used methods can be used. For example, the astigmatism method etc. can be used as the method of detection of the focus error signal, while a push pull method, a three beam method, etc. can be used as the method of detection of the tracking error signal.

As described above, by using the combination lens SIL able to suppress misalignment of the optical axes of lenses occurring at the time of combination and enabling adjustment with a high precision according to the first embodiment, an optical pickup device and optical disk drive mounting an object lens of a high numerical aperture able to handle greater capacities can be configured.

Third Embodiment

Figure 15:
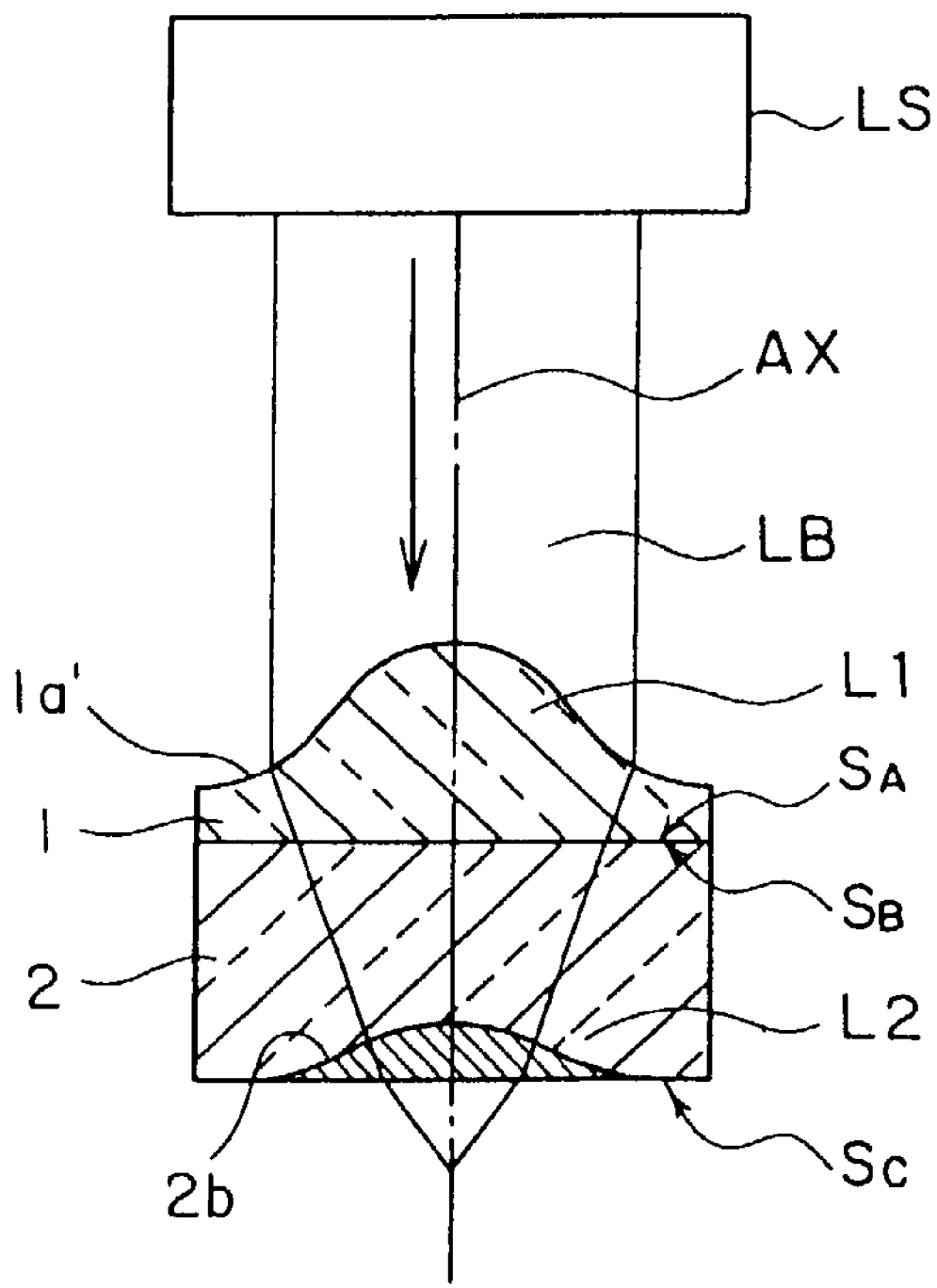
FIG. 15 is a sectional view of the schematic configuration of a combination lens (SIL) according to a third embodiment.

FIG. 15 is a sectional view of the schematic configuration of a combination lens (SIL) according to the present embodiment. It is configured substantially the same as the combination lens SIL according to the first embodiment and is structured by a first convex lens L1 and a second convex lens L2.

Figure 16A:
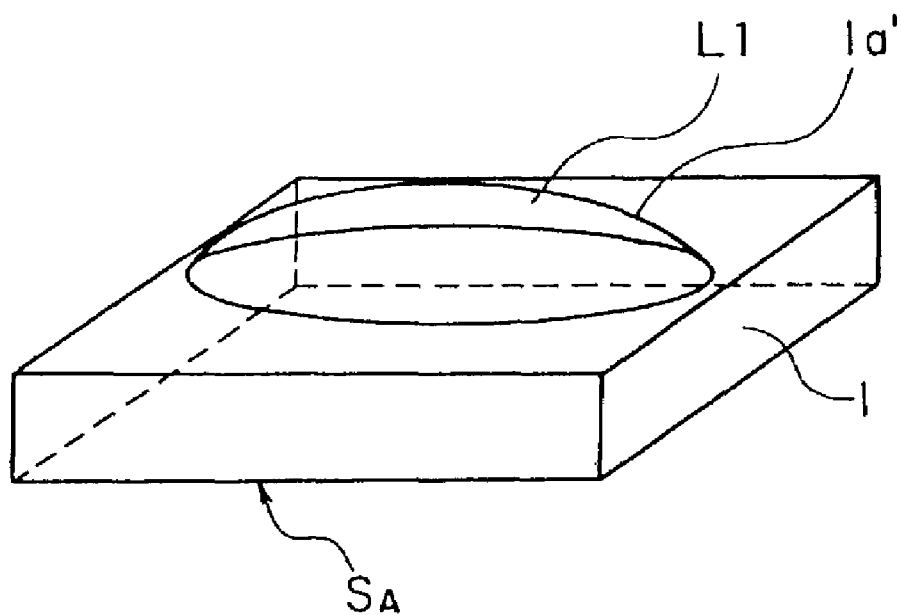
FIG. 16A is a perspective view of a first convex lens according to the third embodiment.
Figure 16B:
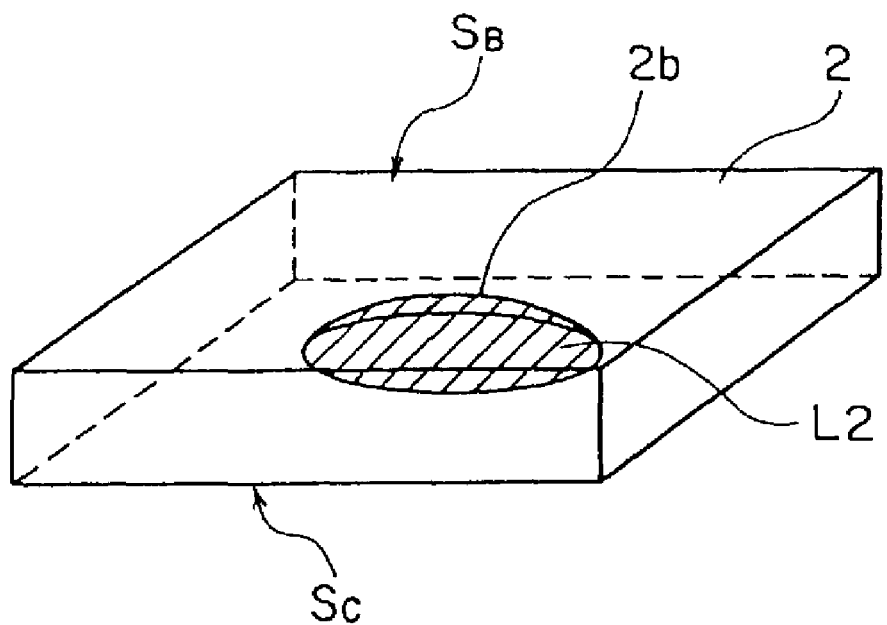
FIG. 16B is a perspective view of a second convex lens.

Further, FIG. 16A is a perspective view of the first convex lens, and FIG. 16B is a perspective view of the second convex lens.

The first convex lens L1 is comprised by the surface of the convexity 1a' provided at the upper surface of a lens body 1 made of glass or another optical material and the lower surface of the lens body 1. The lower surface $S_A$ of the lens body 1 is a flat surface able to serve as a reference surface.

On the other hand, the second convex lens L2 is comprised by burying a material having a higher refractive index than the lens body 2 in a concavity 2b provided in the lower surface of a lens body 2 made of glass or another optical material.

The upper surface $S_B$ and the lower surface $S_C$ of the lens body 2 of the portions other than the concavity 2b of the lens body 2 are flat surfaces able to serve as reference surfaces.

The first convex lens L1 and the second convex lens L2 are arranged on the identical optical axis AX. The lower surface $S_A$ of the lens body 1 and the upper surface $S_B$ of the lens body 2 are fixed by bonding. The SIL is configured so that a light beam LB from the light source LS passes through the first convex lens L1, then passes through the second convex lens L2 and is focused on a predetermined point on the optical axis AX at the side opposite to the first convex lens L1.

In the SIL of the present embodiment, the first convex lens is a lens where the surface of the lens body on the emitting side of the light is a flat surface, and the second convex lens is also a lens where the surface of the lens body on the incident side of the light is a flat surface.

There is no need to bring the center portions of two curved surfaces into register as in the case where both of the lenses have both the incident side and the emitting side as curved surfaces. By adhering together the flat surfaces as described above, it is possible to suppress misalignment of the optical axes of lenses occurring at the time of combination and make adjustments with a high precision.

It is possible to produce the SIL according to the present embodiment in the same way as the SIL according to the first embodiment.

Specifically, in the same way as the SIL of the first embodiment, the first lens aggregate 10 and the second lens aggregate 20 are formed, the lower surface 10b and the upper surface 20a thereof are adhered together, division lines DV are set inside the concavities 1a forming the first convex lenses, and the adhered member is divided to give shapes of first convex lenses having only the convexities 1a'.

Alternatively, the upper surface of the first lens aggregate is given a shape having the convexities 1a', is adhered to the second lens aggregate, then the adhered member is divided into individual SILs to obtain the above shapes.

The SIL according to the present embodiment can be used as the object lens of the optical pickup and the optical disk drive shown in the second embodiment in the same way as the SIL according to the first embodiment, whereby an optical pickup device and optical disk drive mounting an object lens of a high numerical aperture able to handle greater capacities can be configured.

Fourth Embodiment

Figure 17:
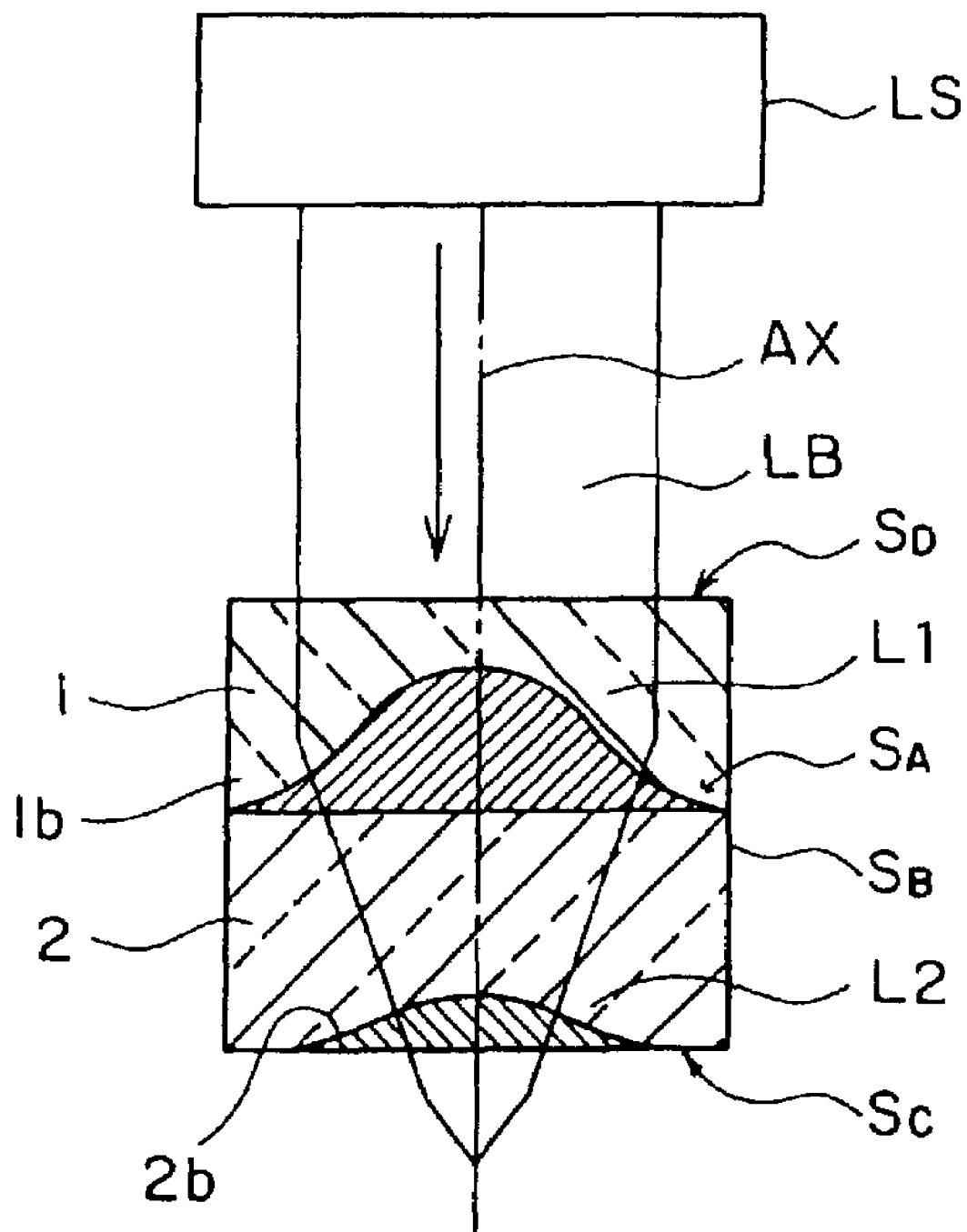
FIG. 17 is a sectional view of the schematic configuration of a combination lens (SIL) according to a fourth embodiment.

FIG. 17 is a sectional view of the schematic configuration of a combination lens (SIL) according to the present embodiment. Substantially, in the same way as in the combination lens SIL according to the first embodiment, it is structured by a first convex lens L1 and a second convex lens L2.

Figure 18A:
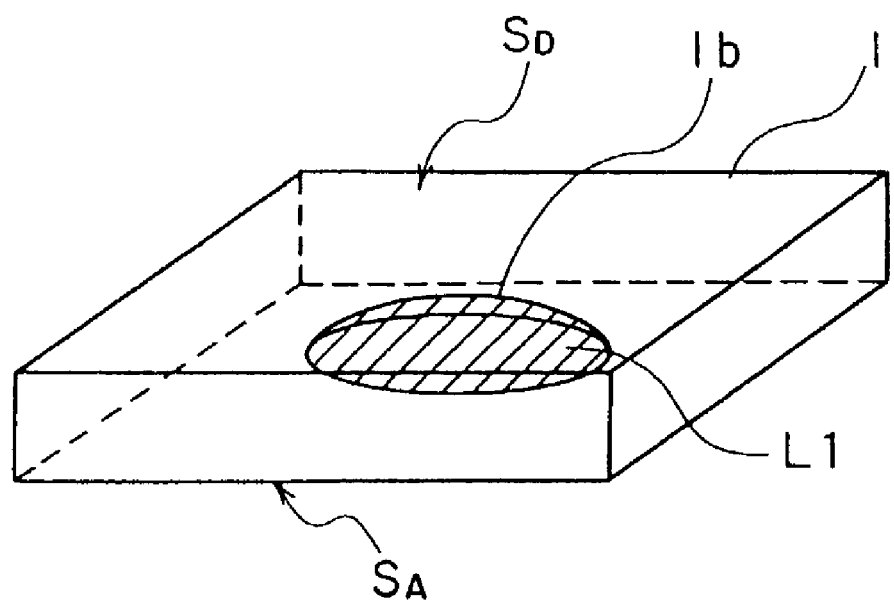
FIG. 18A is a perspective view of a first convex lens according to the fourth embodiment.
Figure 18B:
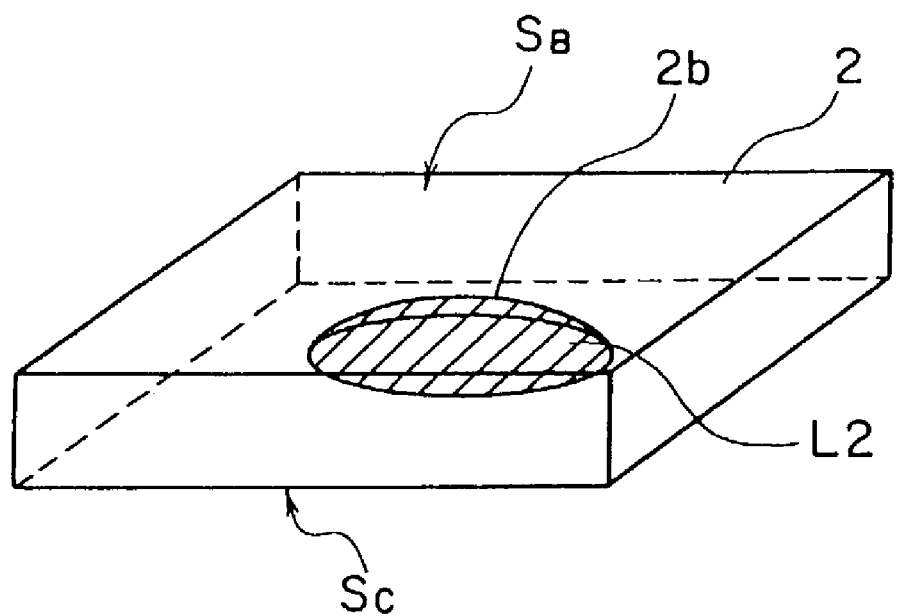
FIG. 18B is a perspective view of a second convex lens.

Further, FIG. 18A is a perspective view of the first convex lens, and FIG. 18B is a perspective view of the second convex lens.

The first convex lens L1 is comprised by burying a material having a higher refractive index than the lens body 1 in a concavity 1b provided in the lower surface of a lens body 1 made of glass or another optical material.

The upper surface $S_D$ and the lower surface $S_A$ of the lens body 1 of the portions other than the concavity 1b of the lens body 1 become flat surfaces able to serve as reference surfaces.

On the other hand, the second convex lens L2 has a similar structure and is formed by burying a material having a higher refractive index than the lens body 2 in a concavity 2b provided in the lower surface of a lens body 2 made of glass or another optical material.

The upper surface $S_B$ and the lower surface $S_C$ of the lens body 2 of the portions other than the concavity 2b of the lens body 2 become flat surfaces able to serve as reference surfaces.

The first convex lens L1 and the second convex lens L2 are arranged on the identical optical axis AX. The lower surface $S_A$ of the lens body 1 and the upper surface $S_B$ of the lens body 2 are fixed by bonding. The SIL is comprised so that the light beam LB from the light source LS passes through the first convex lens L1, then passes through the second convex lens L2 and is focused on a predetermined point on the optical axis AX at the side opposite to the first convex lens L1.

In the SIL of the present embodiment, the first convex lens is a lens where the surface of the lens body on the incident side of the light is a flat surface and where the surface of the portions other than the concavity 1b on the emitting side of the light is a flat surface. On the other hand, the second convex lens is also a lens body where the surface of the lens body on the incident side of the light is a flat surface.

There is no need to bring the center portions of two curved surfaces into register as in the case where both of the lenses have both the incident side and the emitting side as curved surfaces. By adhering together the flat surface of the portions of the first convex lens other than the concavity 1b of the emitting side of the light and the surface of the second convex lens of the incident side as described above, it is possible to suppress misalignment of the optical axes of lenses occurring at the time of combination and make adjustments with a high precision.

It is possible to produce the SIL according to the present embodiment in the same way as the SIL according to the first embodiment.

For example, it is possible to form the first lens aggregate and the second lens aggregate of the present embodiment in the same way as the second lens aggregate according to the first embodiment, adhere together the lower surface of the first lens aggregate and the upper surface of the second lens aggregate, and divide the adhered member into individual SILs to obtain the above shapes.

The SIL according to the present embodiment can be used as the object lens of the optical pickup device and the optical disk drive shown in the second embodiment in the same way as the SIL according to the first embodiment, whereby an optical pickup device and optical disk drive mounting an object lens of a high numerical aperture able to handle greater capacities can be configured.

Fifth Embodiment

Figure 19:
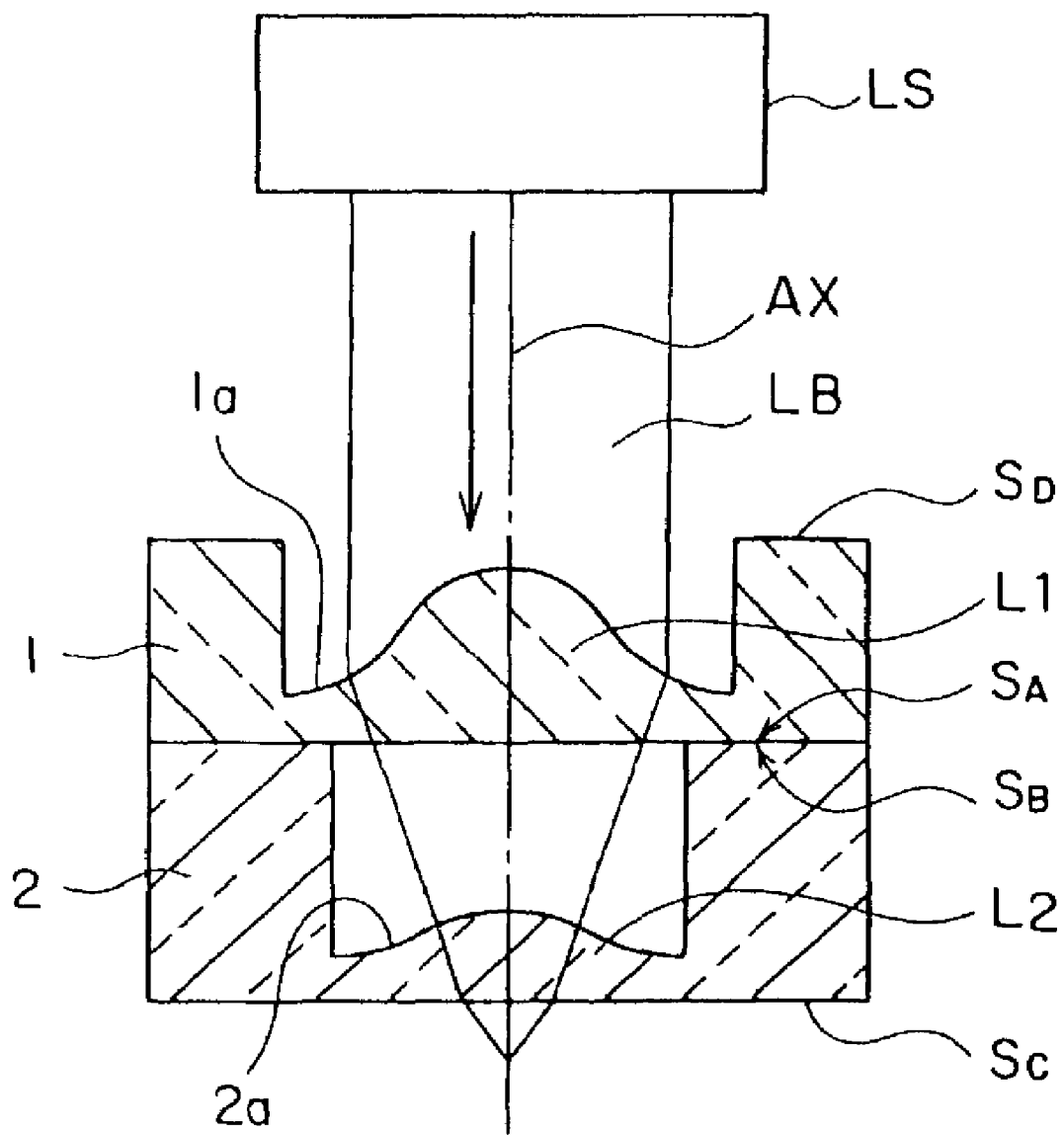
FIG. 19 is a sectional view of the schematic configuration of a combination lens (SIL) according to a fifth embodiment.

FIG. 19 is a sectional view showing the schematic configuration of a combination lens (SIL) according to the present embodiment. Substantially, in the same way as the combination lens SIL according to the first embodiment, it is structured by a first convex lens L1 and a second convex lens L2.

Figure 20A:
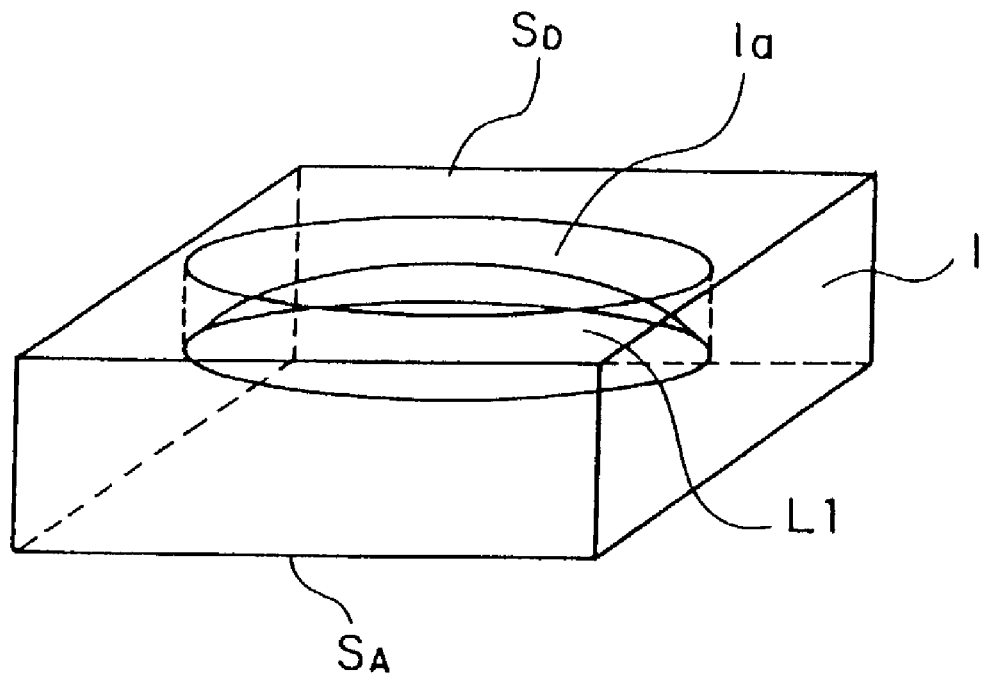
FIG. 20A is a perspective view of a first convex lens according to the fifth embodiment.
Figure 20B:
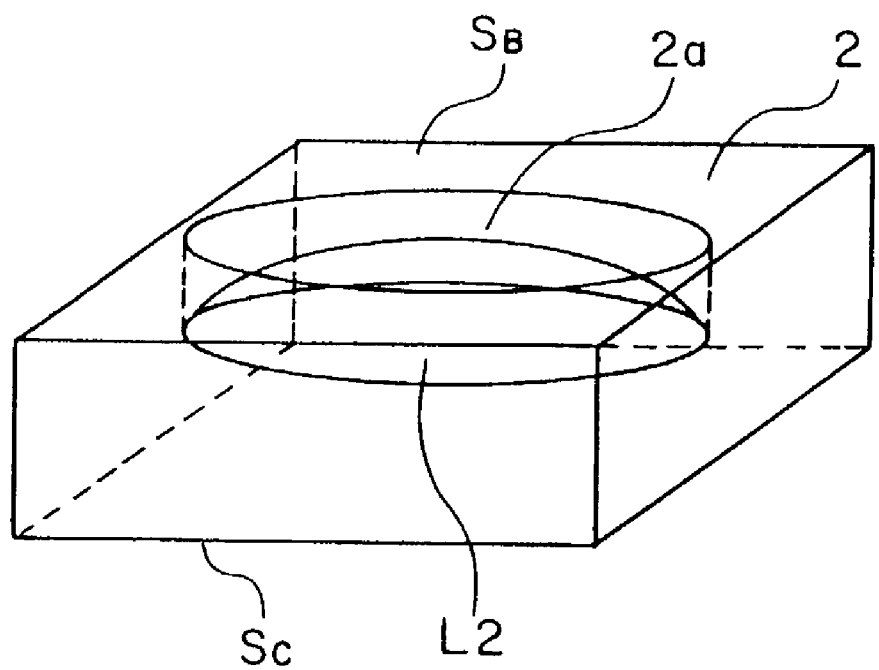
FIG. 20B is a perspective view of a second convex lens.

Further, FIG. 20A is a perspective view of the first convex lens, and FIG. 20B is a perspective view of the second convex lens.

The first convex lens L1 is comprised by the surface of a concavity 1a having a bottom surface of a convex shape provided at an upper surface of a lens body 1 made of glass or another optical material and the lower surface of the lens body 1. The upper surface $S_D$ and the lower surface $S_A$ of the lens body 1 of the portions other than this concavity 1a become flat surfaces able to serve as reference surfaces.

On the other hand, the second convex lens L2 is similarly comprised by the surface of a concavity 2a having a bottom surface of a convex shape provided at the upper surface of a lens body 2 made of glass or another optical material and the lower surface of the lens body 2. The upper surface $S_B$ and the lower surface $S_C$ of the lens body 2 of the portions other than this concavity 2a become flat surfaces able to serve as reference surfaces.

The first convex lens L1 and the second convex lens L2 are arranged on the identical optical axis AX. The lower surface $S_A$ of the lens body 1 and the upper surface $S_B$ of the lens body 2 are fixed by bonding. The SIL is comprised so that the light beam LB from the light source LS passes through the first convex lens L1, then passes through the second convex lens L2 and is focused on a predetermined point on the optical axis AX at the side opposite to the first convex lens L1.

In the SIL of the present embodiment, the first convex lens is a lens where the surface of the lens body on the emitting side of the light is a flat surface, and while, the second convex lens is a lens where the surface of the portion except the concavity 2a on the incident side of the light is a flat surface.

There is no need to bring the center portions of two curved surfaces into register as in the case where both of the lenses have both the incident side and the emitting side as curved surfaces. By adhering together the surface of the first convex lens of the emitting side of the light and the flat surface of the surface of the second convex lens at the portions other than the concavity 2a at the incident side of light as described above, it is possible to suppress misalignment of the optical axes of lenses occurring at the time of combination and make adjustments with a high precision.

It is possible to produce the SIL according to the present embodiment in the same way as the SIL according to the first embodiment.

For example, it is possible to form the first lens aggregate and the second lens aggregate of the present embodiment in the same way as the first lens aggregate according to the first embodiment, adhere together the lower surface of the first lens aggregate and the upper surface of the second lens aggregate, and divide the adhered member into individual SILs to obtain the above shapes.

The SIL according to the present embodiment can be used as the object lens of the optical pickup device and the optical disk drive shown in the second embodiment in the same way as the SIL according to the first embodiment, whereby an optical pickup device and optical disk drive mounting an object lens of a high numerical aperture able to handle greater capacities can be configured.

The present invention was explained by embodiments above, but the present invention is not limited to these embodiments.

For example, the shapes of the convex lenses forming the combination lenses of the present invention are not limited to those described above.

Further, the combination lenses of the present invention can be used for other purposes than usage as the object lenses of optical pickups and optical disk drives.

Further, the material of the body forming the above optical lens, and the material having a higher refractive index than that of the body are not particularly limited.

It is possible to make various other modifications within a range not out of the gist of the present invention.

INDUSTRIAL APPLICABILITY

In the lens of the present invention, since one surface of the incident side or the emitting side of the light of the lens body is a flat surface, it is unnecessary to bring the center portions of two curved surfaces into register as in the case where both of the incident side and the emitting side are curved surfaces. Further, even when combined with another lens to form a combination lens, the above flat surface can be used as the reference surface. It is possible to suppress misalignment of the optical axes of lenses occurring at the time of combination and able to make adjustments high precisely.

In the combination lens of the present invention, it is not necessary to bring the center portions of two curved surfaces into register as in the case where both of the incident side and the emitting side of the first lens and the second lens forming the combination lens are curved surfaces. Further, they have flat surface serving as reference surfaces when combined with other lenses. Accordingly, the combination lens enables suppression of misalignment of the optical axes of the lenses occurring at the time of combination and enables high precision adjustment.

In the method of producing a combination lens of the present invention, by forming a first lens aggregate having a reference surface by integrally forming first lenses, forming a second lens aggregate having a reference surface by integrally forming second lenses, and adhering together the reference surfaces, it is possible to suppress misalignment of the optical axes of the lenses in the adhering step. Further, since the positioning marks are positioned together, the surfaces can be adhered while defining the position with a high precision. Accordingly, it is possible to produce a combination lens able to suppress misalignment of the optical axes of the lenses occurring at the time of combination and be adjusted with a high precision. Further, it is possible to assemble a large number of lenses high precisely at one time.

The optical pickup device of the present invention is an optical pickup device mounting an object lens of the high numerical aperture able to handle greater capacities by using a combination lens able to suppress misalignment of the optical axes of the lenses occurring at the time of combination and be adjusted with a high precision.

The optical disk drive of the present invention is an optical disk drive mounting an object lens of the high numerical aperture able to handle greater capacities by using a combination lens able to suppress misalignment of the optical axes of the lenses occurring at the time of combination and be adjusted with a high precision.

The invention claimed is:

1. A combination lens formed by adhering together: a first lens comprising a lens body wherein a surface of an incident side of light is a flat surface and another surface parallel to the surface formed as the flat surface is a flat surface having a concavity filled with a material having a higher refractive index than said lens body; and a second lens comprising a lens body wherein a first surface of an incident side of light is a flat surface and a second surface of an emitting side of light is a concave surface, wherein said flat surface having a concavity of said first lens and said flat surface of said second lens serve as reference surfaces for positioning and misalignment suppression, and the first surface faces a light generating unit and is closer to the light generating unit than the second surface, and said second surface is filled with a material having a higher refractive index than the lens body of said second lens.

2. A combination lens as set forth in claim 1, obtained by adhering together said flat surface having a concavity of said first lens and the flat surface of said second lens.

* * * * *